United States Patent
Yu et al.

(10) Patent No.: US 11,963,139 B2
(45) Date of Patent: Apr. 16, 2024

(54) SIDELINK LOGICAL CHANNEL MULTIPLEXING METHOD AND APPARATUS

(71) Applicant: HUAWEI TECHNOLOGIES CO., LTD., Guangdong (CN)

(72) Inventors: Chang Yu, Shenzhen (CN); Xiao Xiao, Shenzhen (CN); Junren Chang, Beijing (CN); Xiangdong Zhang, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 357 days.

(21) Appl. No.: 17/514,589

(22) Filed: Oct. 29, 2021

(65) Prior Publication Data

US 2022/0053464 A1 Feb. 17, 2022

Related U.S. Application Data

(63) Continuation of application No. PCT/CN2020/088436, filed on Apr. 30, 2020.

(30) Foreign Application Priority Data

Apr. 30, 2019 (CN) .......................... 201910364619.3

(51) Int. Cl.
*H04W 72/04* (2023.01)
(52) U.S. Cl.
CPC ................... *H04W 72/04* (2013.01)
(58) Field of Classification Search
CPC ....... H04W 4/40; H04W 72/02; H04W 72/04; H04W 72/53; H04W 72/56

(Continued)

(56) References Cited

U.S. PATENT DOCUMENTS

2016/0088624 A1 3/2016 Lee et al.
2019/0053251 A1* 2/2019 Loehr ............... H04W 72/1263
(Continued)

FOREIGN PATENT DOCUMENTS

CN 107046697 A 8/2017
CN 108633088 A 10/2018
(Continued)

OTHER PUBLICATIONS

R2-1903795, Spreadtrum Communications: "Logical channel prioritization Consideration", 3GPP Draft,3rd Generation Partnership Project (3GPP), Mobile Competence Centre, 650, Route Des Lucioles, F-06921 Sophia-Antipolis Cedex, France, vol. RAN WG2, No. Xi'an, China, Apr. 8, 2019-Apr. 12, 2019 Mar. 29, 2019, XP051693047.

(Continued)

*Primary Examiner* — Robert J Lopata
(74) *Attorney, Agent, or Firm* — WOMBLE BOND DICKINSON (US) LLP

(57) ABSTRACT

Embodiments of the application provide a sidelink logical channel multiplexing method and apparatus. After determining a first sidelink logical channel (SL LCH) that meets a first preset condition in at least one SL LCH, a terminal allocates a resource to data of the first SL LCH. Then, when a remaining resource of transmission resources is more than zero, the terminal determines, according to a communication range of the first SL LCH, a second SL LCH that meets a second preset condition, and allocates a resource to data of the second SL LCH. The first SL LCH and the second SL LCH are different. In the method, such a parameter as a communication range is considered in a multiplexing process, and data of SL LCHs with same or different communication ranges is multiplexed into a same transport block.

18 Claims, 10 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2020/0229198 | A1* | 7/2020 | Kung | H04W 72/54 |
| 2020/0344771 | A1* | 10/2020 | Kang | H04W 28/0263 |
| 2020/0351212 | A1* | 11/2020 | Loehr | H04L 67/61 |
| 2021/0153065 | A1* | 5/2021 | Adjakple | H04W 76/14 |
| 2021/0204301 | A1* | 7/2021 | Lee | H04W 72/566 |
| 2021/0266804 | A1* | 8/2021 | Lee | H04W 36/06 |
| 2022/0022244 | A1* | 1/2022 | Zhao | H04W 72/23 |
| 2022/0103298 | A1* | 3/2022 | Lee | H04L 1/189 |
| 2022/0240225 | A1* | 7/2022 | Lee | H04W 72/02 |

FOREIGN PATENT DOCUMENTS

| | | |
|---|---|---|
| EP | 3125643 A1 | 2/2017 |
| WO | 2018171651 A1 | 9/2018 |
| WO | 2021063356 A1 | 4/2021 |

OTHER PUBLICATIONS

3GPP TS 36.321 V15.5.0 (Mar. 2019), 3rd Generation Partnership Project; Technical Specification Group Radio Access Network; Evolved Universal Terrestrial Radio Access (E-UTRA); Medium Access Control (MAC) protocol specification (Release 15), total 131 pages.

3GPP TS 38.321 V15.5.0 (Mar. 2019), 3rd Generation Partnership Project; Technical Specification Group Radio Access Network; NR;Medium Access Control (MAC) protocol specification(Release 15), total 78 pages.

R2-1903795( Revision of R2-1900933), Spreadtrum Communications, Logical channel prioritization Consideration, 3GPP TSG-RAN WG2 Meeting #105bis, Xi an, China, Apr. 8-12, 2019, total 3 pages.

TDoc R2-1904711, Ericsson, On the use of communication range at access stratum, 3GPP TSG-RAN WG2 #105bis, Xi an, China, Apr. 8-12, 2019, total 3 pages.

R2-1914925, vivo, Left LCP issues, 3GPP TSG-RAN WG2 Meeting #108, Reno, USA, Nov. 18-22, 2019, total 5 pages.

* cited by examiner

SIDELINK LOGICAL CHANNEL MULTIPLEXING METHOD AND APPARATUS

CROSS-REFERENCE TO RELATED APPLICATIONS

This application is a continuation of International Application No. PCT/CN2020/088436, filed on Apr. 30, 2020, which claims priority to Chinese Patent Application No. 201910364619.3, filed on Apr. 30, 2019. The disclosures of the aforementioned applications are hereby incorporated by reference in their entireties.

TECHNICAL FIELD

Embodiments of the application relate to the field of communication technologies, and in particular, to a sidelink logical channel multiplexing method and apparatus.

BACKGROUND

In a vehicle to everything (V2X) communication system, a media access control (MAC) layer entity of a transmit end device usually multiplexes data of a plurality of SL LCHs into a same MAC protocol data unit (PDU) in descending order of priorities of sidelink logical channels (SL LCHs). This process is referred to as SL logical channel prioritization (LCP). Then, the MAC layer entity delivers the MAC PDU to a physical (PHY) layer entity of the transmit end device. The PHY layer entity of the transmit end device sends the MAC PDU to a receive end device through a direct channel (for example, a PC5 interface) between the transmit end device and the receive end device.

A parameter, namely, a communication range is introduced in a new radio (NR) V2X communication system. The physical layer entity of the transmit end device adjusts transmit power based on the communication range.

SUMMARY

The application provides a sidelink logical channel multiplexing method and apparatus. In a multiplexing process, such a parameter as a communication range is considered, so that utilization of transmission resources is improved, and a waste of the transmission resources is avoided or minimized.

To achieve the foregoing objective, the application provides the following technical solutions.

In at least one embodiment, the application provides an SL LCH multiplexing method. After determining an SL LCH (referred to as a first SL LCH for short) that meets a first preset condition in at least one SL LCH, a terminal allocates a resource to data of the first SL LCH. Then, when a remaining resource of the transmission resources is more than zero, the terminal determines, based on a communication range of the first SL LCH, a second SL LCH that meets a second preset condition in the at least one SL LCH, and allocates a resource to data of the second SL LCH. The first SL LCH and the second SL LCH are different. In the method, such a parameter as a communication range is considered in a multiplexing process, and data of SL LCHs with same or different communication ranges may be multiplexed into a same transport block, so that utilization of the transmission resources is improved, and a waste of the transmission resources is avoided or minimized.

In an embodiment, the first preset condition includes: a communication range of an SL LCH is equal to a preset threshold; or includes: a priority of an SL LCH is a first priority.

The first SL LCH is a reference for the terminal to select the second SL LCH, and the terminal may select the first SL LCH based on a communication range or a priority. The first priority in the application may be a highest priority in the at least one SL LCH, or may be the second highest priority. This is not limited in the application.

In an embodiment, the second preset condition includes: a communication range of an SL LCH is smaller than or equal to the communication range of the first SL LCH; or includes: a communication range of an SL LCH is located in a multiplexing interval; or includes: a communication interval of an SL LCH includes the communication range of the first SL LCH; or includes: a communication interval of an SL LCH has an intersection with a multiplexing interval, where the multiplexing interval is [the communication range of the first SL LCH−a first deviation value, the communication range of the first SL LCH], and the first deviation value is a deviation value of the communication range of the first SL LCH, namely, a deviation value of a communication range configured for the first SL LCH; and the communication interval of the SL LCH is [the communication range of the SL LCH, the communication range of the SL LCH+a deviation value of the communication range of the SL LCH].

In the application, a value of the communication range may affect transmit power of the terminal. If the terminal sends the data of the first SL LCH, a communication range that can be ensured by the transmit power of the terminal is the communication range of the first SL LCH. In this way, for an SL LCH (for example, the second SL LCH) whose communication range is smaller than or equal to the communication range of the first SL LCH, at same transmit power, the terminal may also successfully send data of the SL LCH. Based on this, the terminal determines, based on the communication range of the first SL LCH, a second SL LCH that meets any one of the second preset conditions.

In an embodiment, the second preset condition includes: a communication range of an SL LCH is smaller than or equal to the communication range of the first SL LCH; or includes: a communication range of an SL LCH is located in a multiplexing interval; or includes: a communication interval of an SL LCH includes the communication range of the first SL LCH; or includes: a communication interval of an SL LCH has an intersection with a multiplexing interval, where the multiplexing interval is [the communication range of the first SL LCH−a first deviation value, the communication range of the first SL LCH+the first deviation value] or [the communication range of the first SL LCH, the communication range of the first SL LCH+the first deviation value]; and the communication interval of the SL LCH is [the communication range of the SL LCH−a deviation value of the communication range of the SL LCH, the communication range of the first SL LCH+the deviation value of the communication range of the SL LCH] or [the communication range of the SL LCH, the communication range of the first SL LCH+the deviation value of the communication range of the SL LCH].

The communication range in the application is used to identify a smallest communication range. Therefore, the terminal may multiplex data of an SL LCH whose communication range is smaller than or equal to (the communication range of the first SL LCH+the first deviation value) and the data of the first SL LCH into a same transport block.

In an embodiment, a method in which "the terminal determines, based on a communication range of the first SL LCH, a second SL LCH that meets a second preset condition in the at least one SL LCH" is that: The terminal determines, as the second SL LCH, an SL LCH other than the first SL LCH in the at least one SL LCH, and whose priority is higher than that of another SL LCH in SL LCHs that meet the second preset condition.

After determining the first SL LCH, the terminal determines, in descending order of priorities, whether an SL LCH other than the first SL LCH in the at least one SL LCH meets the second preset condition. If determining, in descending order of priorities, that an SL LCH meets the second preset condition, the terminal determines the SL LCH as the second SL LCH.

In an embodiment, a deviation value of communication range is configured for each terminal, that is, all SL LCHs of the terminal use a same deviation value of communication range. Offset values of communication range configured for different terminals may be the same or may be different.

In an embodiment, when a remaining resource of the transmission resources is more than zero, and a third SL LCH is configured for the terminal, the terminal allocates a resource to data of the third SL LCH. Herein, the third SL LCH does not meet the second preset condition, and a priority of the third SL LCH is higher than a priority of at least one of the first SL LCH and all SL LCHs that meet the second preset condition in the at least one SL LCH.

In an embodiment, a priority of the third SL LCH is higher than priorities of the first SL LCH and all SL LCHs that meet the second preset condition in the at least one SL LCH.

When the remaining resource of the transmission resources (for example, transport blocks/sidelink resources) is more than zero, the terminal allocates the resource to the data of the third SL LCH, so that transmission of data of a high-priority SL LCH is ensured, and utilization of the transmission resources is further improved.

In an embodiment, before allocating the resource to the data of the third SL LCH, the terminal allocates resources to data of all SL LCHs that meet the second preset condition in the at least one SL LCH.

The terminal may allocate the resource to the data of the third SL LCH after allocating the resources to the data of all the SL LCHs that meet the second preset condition in the at least one SL LCH. Alternatively, the terminal may allocate the resource to the data of the third SL LCH before allocating resources to data of one or more SL LCHs that meet the second preset condition in the at least one SL LCH. This is not limited in the application.

In an embodiment, in a scenario in which the at least one SL LCH includes an SL LCH that meets a transmission performance parameter requirement, and the transmission performance parameter includes a first communication range, if a fourth SL LCH is configured for the terminal, the terminal determines that the at least one SL LCH further includes the fourth SL LCH, a communication range of the fourth SL LCH is larger than the first communication range (corresponding to transmit power of the terminal, for example, maximum transmit power of the terminal), and a priority of the fourth SL LCH is higher than a priority of at least one of the at least one SL LCH. In other words, when determining the at least one SL LCH, the terminal has considered such a parameter as a communication range, and further determines that the at least one SL LCH includes a high-priority SL LCH, so that transmission of data of the high-priority SL LCH is ensured.

In an embodiment, the first communication range corresponds to the maximum transmit power of the terminal.

In an embodiment, when the terminal allocates the resource to the data of the third SL LCH, or when the terminal determines that the at least one SL LCH includes the fourth SL LCH, the terminal further indicates and/or adjusts transmit power of the terminal, to improve reliability of the data.

In an embodiment, the transmit power of the terminal may be current transmit power of the terminal.

In an embodiment, after the terminal allocates the resources to the data of all the SL LCHs that meet the second preset condition in the at least one SL LCH, if there is still a remaining transmission resource, the terminal may multiplex, in descending order of priorities, other SL LCHs that do not meet the second preset condition in the at least one SL LCH. That is, the terminal does not need to determine priorities of the other SL LCHs, and directly multiplexes the other SL LCHs in descending order of priorities.

In an embodiment, the at least one SL LCH in the application corresponds to a same destination identifier.

In at least one embodiment, the application provides a communication apparatus. The communication apparatus may be a terminal, may be a chip in a terminal, may be a system on chip in a terminal, or may be a MAC layer entity or a PHY layer entity.

The communication apparatus may perform functions of the terminal in embodiments of the application, and the functions may be implemented by hardware, or may be implemented by hardware executing corresponding software. The hardware or the software includes one or more modules corresponding to the foregoing functions. For example, the communication apparatus may include a determining unit and a multiplexing unit. For example, the determining unit and the multiplexing unit have functions of a MAC layer entity in the terminal.

The determining unit is configured to determine a first SL LCH, where the first SL LCH is an SL LCH that meets a first preset condition in at least one SL LCH. The multiplexing unit is configured to allocate a resource to data of the first SL LCH determined by the determining unit. The determining unit is further configured to: when a remaining resource of transmission resources is more than zero, determine, based on a communication range of the first SL LCH, a second SL LCH that meets a second preset condition in the at least one SL LCH, where the first SL LCH and the second SL LCH are different. The multiplexing unit is further configured to allocate a resource to data of the second SL LCH determined by the determining unit.

For example, for an embodiment of the communication apparatus, refer to behavior and functions of the terminal in the SL LCH multiplexing method provided in embodiments of the application. Details are not described herein again. Therefore, the provided communication apparatus can achieve same beneficial effects as any one of embodiments described herein.

In at least one embodiment, the application provides a communication apparatus. The communication apparatus includes a processor. The processor is connected to a memory, the memory is configured to store computer instructions, and the processor executes the computer instructions and controls the communication apparatus to perform the SL LCH multiplexing method according to any one of embodiments described herein.

The memory and the processor may be integrated together, or may be independent components. If the memory and the processor are independent components, the memory may be located inside the communication apparatus, or may be located outside the communication apparatus.

In an embodiment, the processor includes a logic circuit and an input interface and/or an output interface. The output interface is configured to enable the communication apparatus to perform a sending action, and the input interface is configured to enable the communication apparatus to perform a receiving action.

In an embodiment, the communication apparatus further includes a communication interface and a communication bus. The processor, the memory, and the communication interface are connected by using the communication bus. The communication interface is configured to communicate with another device.

The communication apparatus may be a terminal, or may be an apparatus as a part in a terminal, for example, a chip system in a terminal. The chip system is configured to support the terminal in performing functions in any one of embodiments described herein, for example, determining and multiplexing data and/or information in the foregoing SL LCH multiplexing method. The chip system includes a chip, and may also include another discrete component or circuit structure.

In at least one embodiment, the application further provides a computer-readable storage medium. The computer-readable storage medium stores computer instructions. When the computer instructions are run on a communication apparatus, the communication apparatus performs the SL LCH multiplexing method according to embodiments described herein.

In at least one embodiment, the application further provides a computer program product. The computer program product includes computer instructions. When the computer instructions are run on a communication apparatus, the communication apparatus is enabled to perform the SL LCH multiplexing method according to embodiments described herein.

It should be noted that all or some of the computer instructions may be stored in a first computer storage medium. The first computer storage medium may be packaged together with a processor of the communication apparatus, or the first computer storage medium and a processor of the communication apparatus may be separately packaged. This is not limited in the application.

In at least one embodiment, the application provides an SL LCH multiplexing method. After determining at least one SL LCH based on a communication range, a terminal allocates a resource to an SL LCH in the at least one SL LCH. Herein, each of the at least one SL LCH meets a third preset condition. In the multiplexing method of the application, such a parameter as a communication range is considered in a data multiplexing process of the SL LCH, and a method to perform data multiplexing of the SL LCH based on the communication range is provided.

In an embodiment, for each of the at least one SL LCH, the third preset condition includes: a communication range of an SL LCH is smaller than or equal to a first communication range, and the first communication range corresponds to transmit power of the terminal; or includes: transmit power allowed by an SL LCH is less than or equal to transmit power of the terminal; or includes: a second communication range is smaller than or equal to a first communication range, the first communication range corresponds to transmit power of the terminal, and the second communication range corresponds to transmit power allowed by an SL LCH.

In an embodiment, when a fifth SL LCH (whose priority is higher than that of at least one LCH in the at least one SL LCH) is configured for the terminal, the terminal determines that the at least one SL LCH further includes the fifth SL LCH. In other words, when determining the at least one SL LCH, the terminal not only considers such a parameter as a communication range, but also determines that the at least one SL LCH includes a high-priority SL LCH, so that transmission of data of the high-priority SL LCH is ensured.

In an embodiment, after the terminal allocates a resource to data of an SL LCH in the at least one SL LCH, if a remaining resource of the transmission resources is more than zero, and a fifth SL LCH (that does not meet the third preset condition and whose priority is higher than that of at least one of the at least one SL LCH) is configured for the terminal, the terminal allocates a resource to data of the fifth SL LCH.

In an embodiment, if there is still a remaining transmission resource, the terminal may multiplex, in descending order of priorities, other SL LCHs that do not meet the third preset condition in the at least one SL LCH. That is, the terminal does not need to determine priorities of the other SL LCHs, and directly multiplexes the other SL LCHs in descending order of priorities.

When the remaining resource of the transmission resources is more than zero, the terminal may allocate a resource to data of a high-priority SL LCH, so that transmission of the data of the high-priority SL LCH is ensured, and utilization of the transmission resources is further improved.

In an embodiment, each of the at least one SL LCH corresponds to a same destination identifier.

The determining unit is configured to determine, based on a communication range, at least one SL LCH, where each of the at least one SL LCH meets a third preset condition. The multiplexing unit is configured to allocate a resource to an SL LCH in the at least one SL LCH determined by the determining unit.

In the application, a name of the communication apparatus does not constitute any limitation to devices or function modules. In at least some embodiments, the devices or the function modules may have other names. All devices or functional modules with functions similar to those in the application fall within the scope defined by the claims of the application and equivalent technologies of the application.

It should be noted that various embodiments may be combined provided that the solutions are not contradictory.

Embodiments of the application are more concise and comprehensible in the following descriptions.

DESCRIPTION OF EMBODIMENTS

The following describes the technical solutions in embodiments of the application with reference to the accompanying drawings in embodiments of the application. In descriptions of the application, unless otherwise specified, "/" means "or". For example, AB may represent A or B. "And/or" in the specification describes only an association relationship for describing associated objects and represents that there may be three relationships. For example, A and/or B may represent the following three cases: Only A exists, both A and B exist, and only B exists. In addition, in the descriptions of the application, "a plurality of" means two or more than two unless otherwise specified. In addition, to clearly describe the technical solutions in embodiments of the application, terms such as "first" and "second" are used in embodiments of the application to distinguish between same items or similar items whose functions and purposes are basically the same. One of ordinary skill in the art may understand that the terms such as "first" and "second" do not limit a quantity or an execution sequence, and the terms such as "first" and "second" do not indicate a definite difference.

Figure 1:
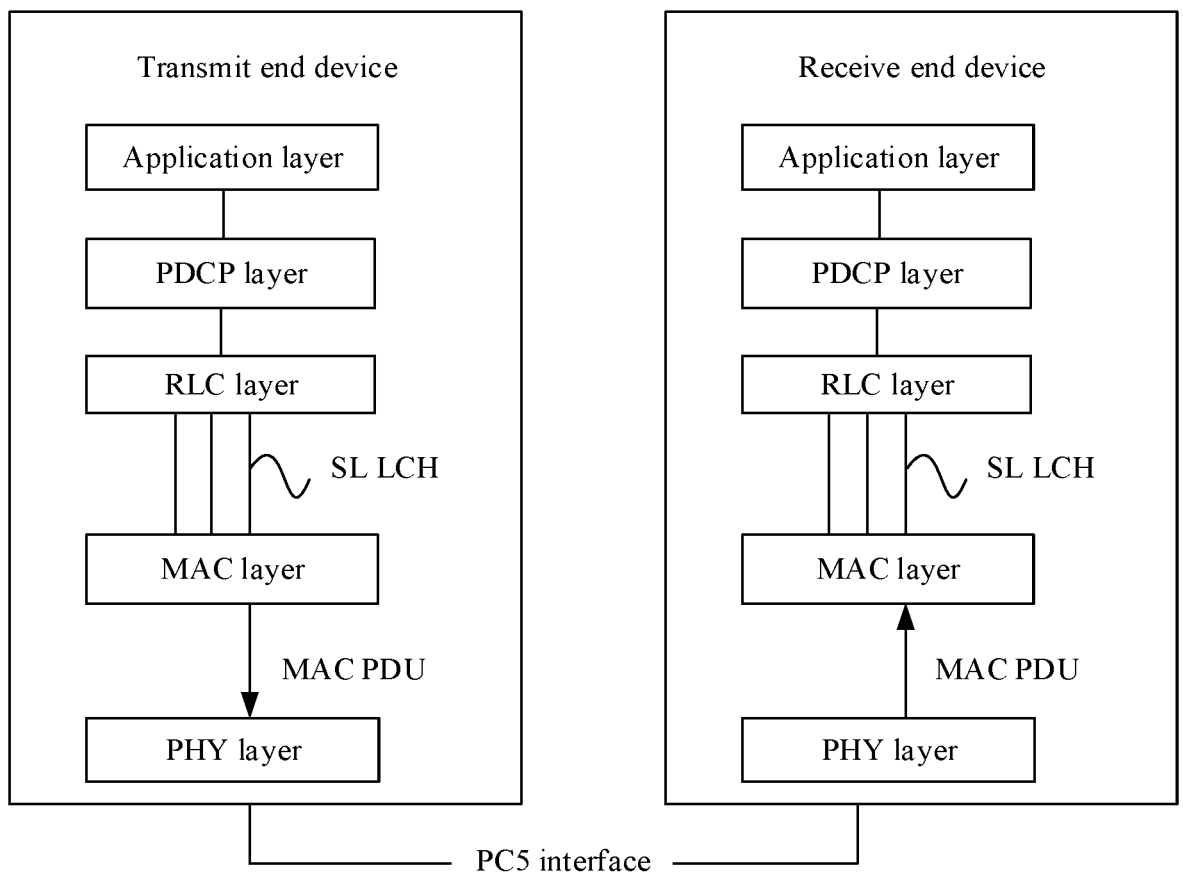
FIG. 1 is a principle block diagram according to an embodiment of the application.

Generally, in a process in which a transmit end device in a V2X communication system sends data to a receive end device, a MAC layer entity of the transmit end device usually multiplexes data of a plurality of SL LCHs into a same MAC PDU in descending order of priorities of the SL LCHs, and delivers the MAC PDU to a physical (PHY) layer entity of the transmit end device. The PHY layer entity of the transmit end device sends the MAC PDU to the receive end device through a direct channel (for example, a PC5 interface) between the transmit end device and the receive end device. FIG. 1 shows this process.

A communication range parameter is provided in a new radio (NR) V2X communication system.

The communication range parameter is used to indicate a smallest communication range, that is, a minimum distance that needs to be ensured to be reachable by the transmit end device when the transmit end device sends data.

For a service that requires a relatively large communication range, a physical layer entity may increase transmit power to ensure that even a terminal located at an edge of the communication range can receive data of the service. However, for a service that requires a relatively small communication range, the physical layer entity may reduce the transmit power, and only needs to ensure that at least a terminal located in the communication range can receive the data of the service. Therefore, the physical layer entity of the transmit end device may adjust the transmit power based on the communication range parameter.

In addition, it is further provided in the NR V2X communication system that: a communication range is configured for each SL LCH, and data of SL LCHs that require different communication ranges cannot be multiplexed into a same transport block.

However, a current technology does not provide an implementation for "data of SL LCHs that require different communication ranges cannot be multiplexed into a same transport block".

Further, if only data of SL LCHs that require a same communication range can be multiplexed into a same transport block, a resource waste may be caused. For example, if in all SL LCHs of a terminal, communication ranges of most SL LCHs are different, data of these SL LCHs cannot be multiplexed into a same transport block, and the terminal needs to separately send the data of these SL LCHs. Consequently, effective utilization of transmission resources decreases.

Therefore, embodiments of the application provide an SL LCH multiplexing method and apparatus, so that the terminal multiplexes data of SL LCHs with similar or same communication ranges into a same transport block. The terminal multiplexes data of SL LCHs with similar communication ranges into a same transport block, that is, the terminal multiplexes data of SL LCHs that require same transmit power into a same transport block. This effectively improves utilization of the transmission resources, and avoids or minimizes a waste of the transmission resources. The terminal multiplexes data of SL LCHs with a same communication range into a same transport block, so that unnecessary power consumption is avoided or minimized.

For example, the terminal determines a first SL LCH that meets a preset condition in at least one SL LCH (for example, including SL LCHs that meet a requirement of a transmission performance parameter), and allocates a resource to data of the first SL LCH. Subsequently, when a remaining resource of transmission resources is more than zero, the terminal determines, based on a communication range of the first SL LCH, a second SL LCH that is different from the first SL LCH in the at least one SL LCH and that meets a second preset condition, and allocates a resource to data of the second SL LCH, so that the data of the first SL LCH and the data of the second SL LCH are multiplexed into a same transport block.

In an embodiment, a communication range of the second SL LCH is smaller than or equal to the communication range of the first SL LCH. The communication range parameter is used to indicate a smallest communication range. In this case, when the first SL LCH is determined, the terminal only needs to ensure that with transmit power used by the terminal, a device located at an edge of the communication range of the first SL LCH can receive the data of the first SL LCH. In this case, for data of an SL LCH whose communication range is smaller than or equal to the communication range of the first SL LCH, the terminal can also ensure reliability of the sent data. Therefore, the terminal allocates a resource to the data of the second SL LCH, so that utilization of transmission resources can be improved, and a waste of the transmission resources can be avoided or minimized.

In another embodiment, each SL LCH of the terminal is configured with a deviation value of a communication range, and a communication range of the second SL LCH is smaller than or equal to a first distance (for example, the communication range of the first SL LCH+a deviation value of the communication range of the first SL LCH). When the first SL LCH is determined, if the terminal can ensure that with transmit power used by the terminal, a device located at an edge of the first distance can receive the data of the first SL LCH, for data of an SL LCH whose communication range is smaller than or equal to the first distance, the terminal can also send the data successfully. Therefore, the terminal allocates the resource to the data of the second SL LCH, so that utilization of transmission resources can be improved, and a waste of the transmission resources can be avoided or minimized.

The SL LCH multiplexing method provided in embodiments of the application may be applied to any communication system in which devices directly communicate with each other, for example, a device to device (D2D) communication system, a machine to machine (M2M) communication system, and a V2X communication system.

The following mainly describes the SL LCH multiplexing method provided in embodiments of the application by using a V2X communication system as an example. For an embodiment of the SL LCH multiplexing method in another communication system, refer to the descriptions in embodiments of the application.

Figure 2:
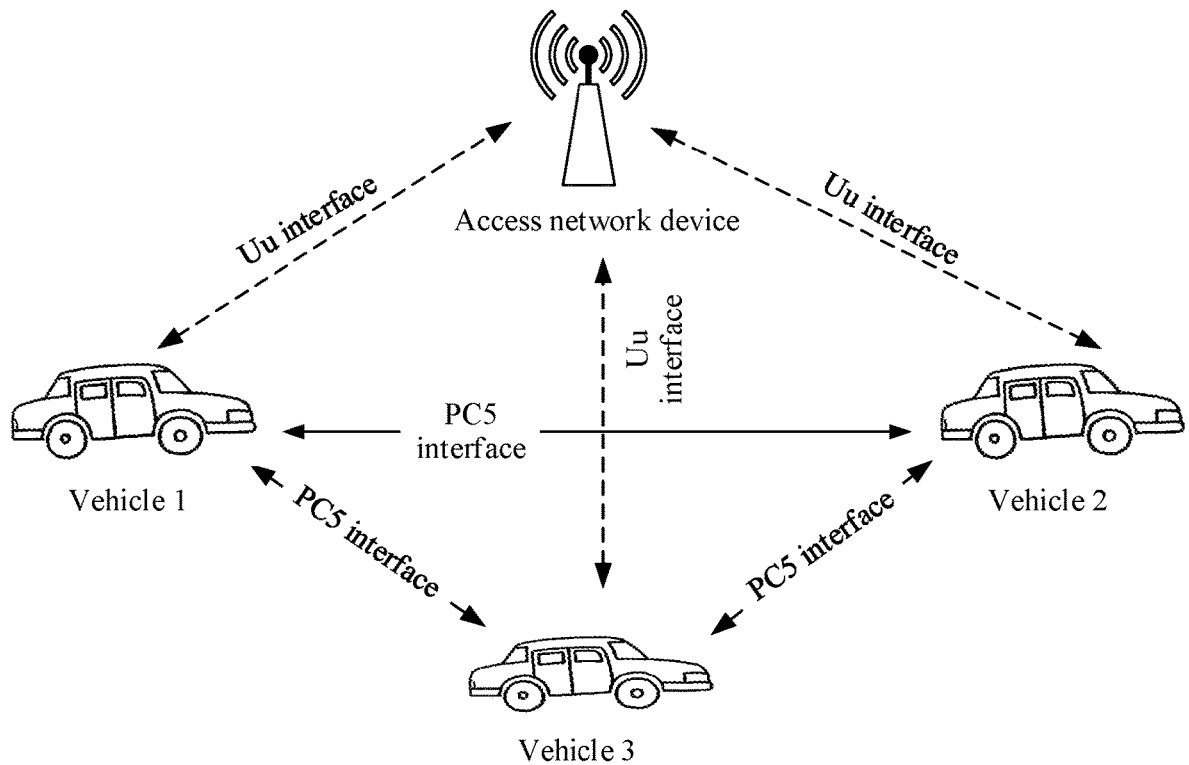
FIG. 2 is a schematic diagram of a structure of a V2X communication system according to an embodiment of the application.

FIG. 2 shows a V2X communication system according to an embodiment of the application. As shown in FIG. 2, the V2X communication system may include a plurality of vehicles (for example, a vehicle 1, a vehicle 2, and a vehicle 3 shown in FIG. 2).

Each vehicle may establish a direct communication link with a surrounding vehicle to perform direct communication. For example, the vehicle 1 and the vehicle 2 may perform direct communication. For example, a direct communication link established between vehicles may be defined as a sidelink (SL), and an interface for direct communication between a vehicle and a surrounding vehicle may be referred to as a PC5 interface.

In addition, the V2X communication system shown in FIG. 2 may further include a radio access network device. The vehicle may send a V2X message to another vehicle by using the radio access network device as a relay, or may access a network by using the radio access network device. For example, the vehicle 1 may send a V2X message to the radio access network device, and the radio access network device sends the V2X message to the vehicle 2. For example, an interface between a vehicle and the radio access network device may be referred to as a Uu interface.

It should be noted that the V2X communication system shown in FIG. 2 is merely a structural diagram used as an example, and does not constitute a limitation on the V2X communication system. In actual application, in addition to the device shown in FIG. 2, the V2X communication system shown in FIG. 2 may further include other devices, for example, an application server, and a core network device.

Figure 3A:
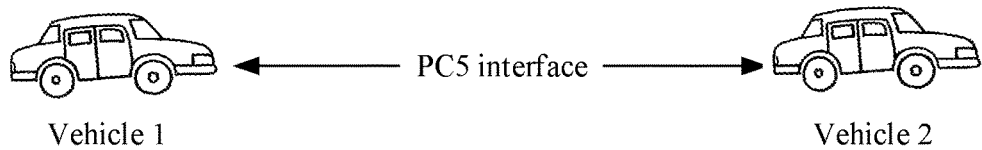
FIG. 3a is a schematic diagram of unicast communication in a V2X communication system according to an embodiment of the application.
Figure 3B:
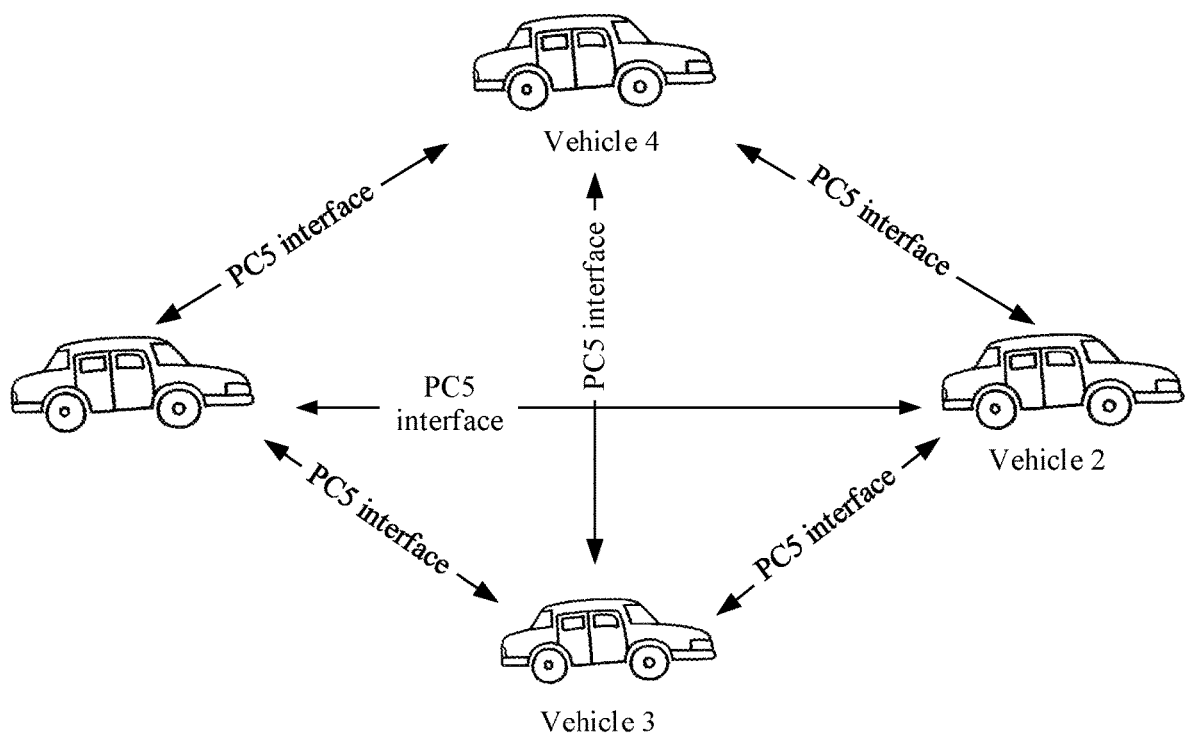
FIG. 3b is a schematic diagram of multicast communication in a V2X communication system according to an embodiment of the application.

The vehicle in FIG. 2 is not limited to any type of vehicle such as a car, a bicycle, an electric vehicle, an airplane, a ship, a train, or a high-speed railway. The vehicle may include a vehicle-mounted device that can directly communicate with another device. The vehicle-mounted device may be referred to as user equipment (UE) or a terminal. The vehicle may be connected to another vehicle in the V2X communication system in a one-to-one manner, that is, perform unicast communication, or may perform multicast communication with a plurality of other vehicles in the V2X communication system. For example, as shown in FIG. 3a, a vehicle 1 may be connected to a vehicle 2 in a one-to-one manner to perform unicast communication. As shown in FIG. 3b, a vehicle 1 and three other vehicles (a vehicle 2, a vehicle 3, and a vehicle 4) may form a communication group, and the vehicles in the communication group perform multicast communication.

Figure 4:
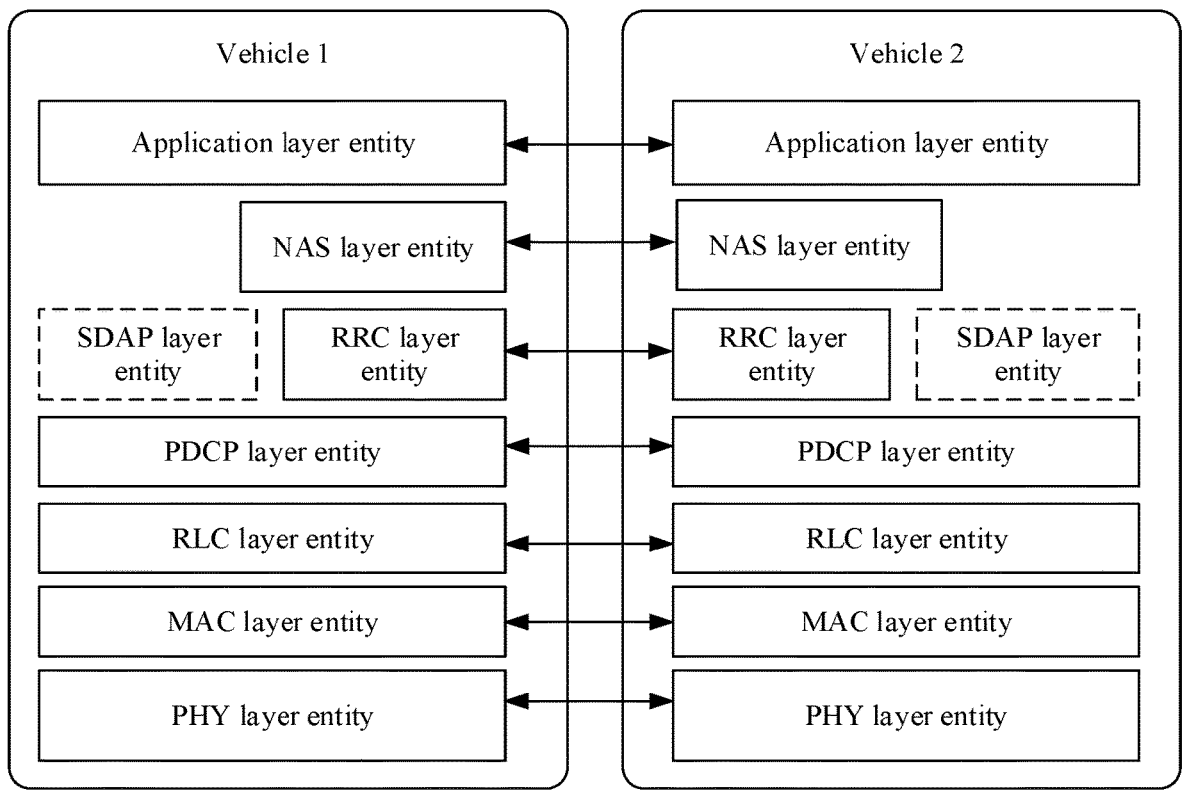
FIG. 4 is a schematic diagram of a protocol stack in a terminal according to an embodiment of the application.

For example, each vehicle shown in FIG. 2 may include protocol layer entities shown in FIG. 4: an application layer entity, a non-access stratum (NAS) entity, a radio resource control (RRC) layer entity, a packet data convergence protocol (PDCP) layer entity, a radio link control (RLC) layer entity, a MAC layer entity, and a PHY layer entity, and may further include a service discovery application profile (SDAP) layer entity, a V2X layer entity, and another newly added protocol layer entity (not shown in FIG. 4).

The vehicle may process transmitted data by using the protocol layer entities shown in FIG. 4. For example, when a vehicle 1 sends data to a vehicle 2, a MAC layer entity of the vehicle 1 determines a first SL LCH, and multiplexes data of the first SL LCH into a MAC PDU. When a remaining resource of the MAC PDU is more than zero, the vehicle 1 determines, based on a communication range of the first SL LCH, a second SL LCH different from the first SL LCH, and multiplexes data of the second SL LCH into the MAC PDU. Subsequently, the MAC layer entity of the vehicle 1 delivers the MAC PDU to a PHY layer entity of the vehicle 1. The PHY layer entity of the vehicle 1 sends the MAC PDU to the vehicle 2 through the PC5 interface.

In an embodiment, names of devices and interfaces between the devices shown in FIG. 2, and names of the protocol layer entities shown in FIG. 4 are merely examples. In at least some embodiments, the names of the devices, the interfaces between the devices, and the protocol layer entities may alternatively be other names. This is not limited in an embodiment of the application.

Figure 5:
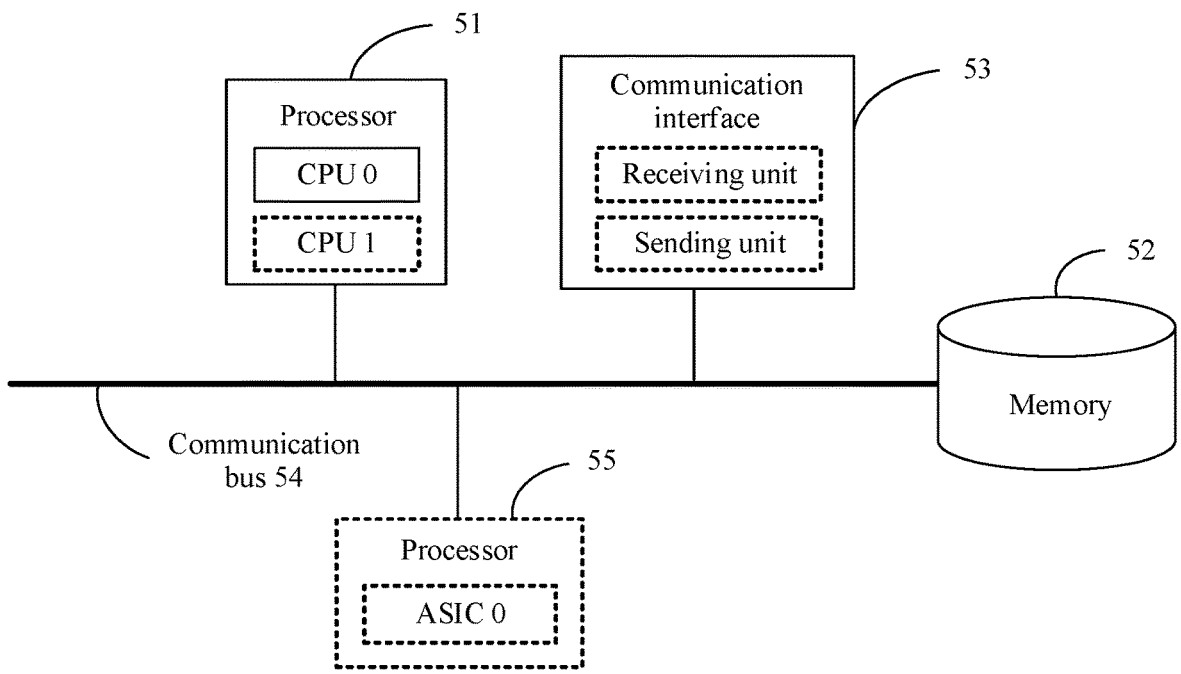
FIG. 5 is a schematic composition diagram of a communication apparatus according to an embodiment of the application.

For example, in an embodiment of the application, the vehicle in FIG. 2 is a terminal. The terminal may be a communication apparatus shown in FIG. 5, or may be a device including the communication apparatus shown in FIG. 5 (for example, the communication apparatus is a chip system/system-on-a-chip of the terminal). FIG. 5 is a schematic composition diagram of a communication apparatus according to an embodiment of the application. The communication apparatus may be configured to perform the SL LCH multiplexing method provided in embodiments of the application.

As shown in FIG. 5, the communication apparatus includes a processor 51, and further includes a memory 52 connected to the processor 51 by using a communication bus 54.

In an embodiment of the application, the processor 51 is a control center of the communication apparatus, and may be one processor, or may be a collective term of a plurality of processing elements. For example, the processor 51 may be a central processing unit (CPU), may be an application-specific integrated circuit (ASIC) 55, or may be one or more integrated circuits configured to provide an embodiment of the application, for example, one or more digital signal processors (DSPs), or one or more field programmable gate arrays (FPGAs).

The processor 51 may run or execute a software program stored in the memory 52 and invoke data stored in the memory 52, to execute various functions of the communication apparatus.

In an embodiment, the processor 51 may include one or more CPUs, such as a CPU 0 and a CPU 1 shown in FIG. 5.

In an embodiment, the communication apparatus may further include another processor, for example, a processor 51 shown in FIG. 5, and the processor 51 includes an ASIC 0. Each of a plurality of processors in the communication apparatus may be a single-core processor (single-CPU), or may be a multi-core processor (multi-CPU). The processor herein may be one or more devices, circuits, and/or processing cores configured to process data (for example, computer program instructions).

In an embodiment of the application, the memory 52 may be a read-only memory (ROM) or another type of static storage device capable of storing static information and instructions, a random access memory (RAM) or another type of dynamic storage device capable of storing information and instructions, or may be an electrically erasable programmable read-only memory (EEPROM), a magnetic disk storage medium or another magnetic storage device, or any other medium capable of carrying or storing expected program code in a form of instructions or a data structure and capable of being accessed by a computer, but is not limited thereto.

In an embodiment, the memory 52 may exist independently of the processor 51, that is, the memory 52 may be a memory outside the processor 51. In this case, the memory 52 may be connected to the processor 51 by using the communication bus 54, and is configured to store instructions or program code. The processor 51 invokes and executes the instructions or the program code stored in the memory 52, to perform the SL LCH multiplexing method provided in an embodiment of the application.

In another embodiment, the memory 52 may alternatively be integrated with the processor 51. In an embodiment, the memory 52 may be an internal memory of the processor 51. For example, the memory 52 is a cache, and may be configured to temporarily store some data, instruction information, and/or the like.

In an embodiment, the communication apparatus further includes a communication interface 53.

The communication interface 53 is configured to use any transceiver-type apparatus, to communicate with another device or a communication network such as the Ethernet, a radio access network (RAN), or a wireless local area network (WLAN). The communication interface 53 may include a receiving unit for performing a receiving function and a sending unit for performing a sending function.

In an embodiment of the application, the communication bus 54 may be an industry standard architecture (ISA) bus, a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 5, but this does not mean that there is only one bus or only one type of bus.

It should be noted that a device structure shown in FIG. 5 does not constitute a limitation on the communication apparatus. In addition to components shown in FIG. 5, the communication apparatus may include more or fewer components than those shown in the figure, or combine some components, or have different component arrangements.

With reference to FIG. 1 to FIG. 5, the following describes the SL LCH multiplexing method provided in an embodiment of the application in detail. In embodiments of the application, names of messages between network elements, names of parameters in messages, or the like are merely examples, and there may be other names. This is not limited in embodiments of the application.

Figure 6:
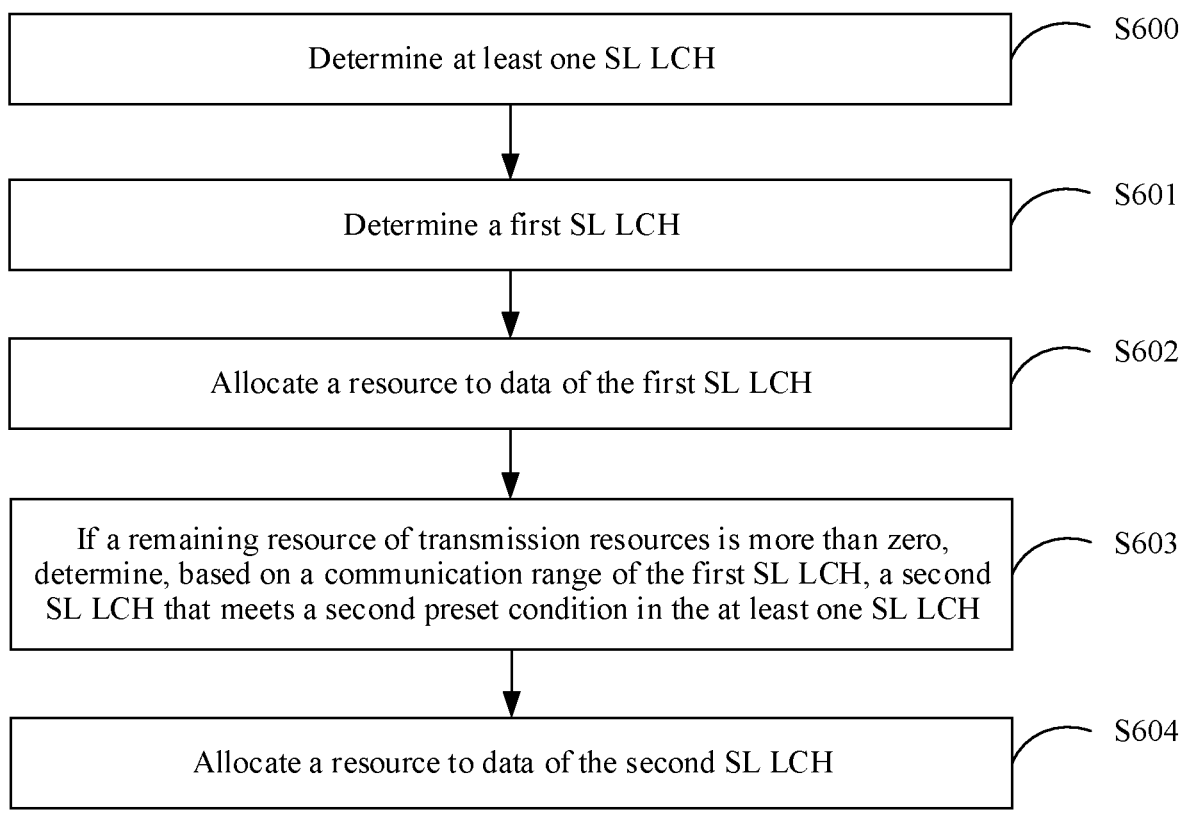
FIG. 6 is a flowchart of an SL LCH multiplexing method according to an embodiment of the application.

FIG. 6 is a flowchart of an SL LCH multiplexing method according to an embodiment of the application. As shown in FIG. 6, the multiplexing method may include the following operations.

S600: A terminal determines at least one SL LCH.

In an embodiment, the at least one SL LCH includes all SL LCHs that have been configured for the terminal. A network device (for example, a base station) or a higher layer (for example, a NAS layer entity) of the terminal configures such a parameter as a communication range for each SL LCH, and a communication range of each SL LCH is used to identify a minimum communication range of the SL LCH.

In another embodiment, the at least one SL LCH includes SL LCHs that meet a transmission performance parameter requirement.

Usually, before sending uplink data, the terminal needs to send an uplink scheduling request to the base station, to obtain a corresponding uplink transmission resource. The base station determines a data transmission amount of the terminal based on the received uplink scheduling request, and allocates an uplink grant resource to the terminal based on the data transmission amount. The terminal selects, from all logical channels based on the allocated uplink grant resource, a logical channel that meets the transmission performance parameter requirement, and then multiplexes data of the selected logical channel into a same transport block in descending order of priorities. A transmission performance parameter includes at least one of a subcarrier spacing, an uplink grant type, physical uplink shared channel (PUSCH) transmission duration, or a requirement of a serving cell.

Similarly, in a V2X communication system, before sending data to a peer end, the terminal may alternatively select an SL LCH that meets the transmission performance parameter requirement from all SL LCHs. Usually, there are a plurality of SL LCHs that meet the transmission performance parameter requirement in all the SL LCHs. In this case, the terminal determines at least one SL LCH, and the at least one SL LCH includes the SL LCH that meets the transmission performance parameter requirement in all the SL LCHs. For example, in an embodiment of the application, the at least one SL LCH is referred to as an LCH group 1.

Further, in an embodiment, the terminal may further determine a plurality of LCHs that are in the LCH group 1 and that correspond to a destination identifier (refer to the following explanation). In this way, the terminal re-determines at least one SL LCH, and the at least one SL LCH includes an LCH corresponding to a same destination identifier (destination ID). For example, in an embodiment of the application, the at least one SL LCH is referred to as an LCH group 2.

The destination identifier usually indicates a type of service message or a type of service data, or indicates a receiving terminal or a receiving terminal group. The destination identifier may be an identifier of a destination. For example, the destination identifier may be a layer 2 destination identifier of a receiving terminal, a group-specific layer 2 destination identifier shared by a group of receiving terminals, or a service-specific layer 2 destination identifier. One destination identifier may correspond to a plurality of SL LCHs.

The terminal multiplexes data in SL LCHs corresponding to a same destination identifier, to ensure that data included in a transport block obtained after multiplexing is complete is data sent to a same terminal or a same terminal group, or corresponding to a same service. A subheader of a MAC PDU may carry a destination identifier, and the destination identifier is a destination identifier corresponding to an SL LCH on which data multiplexed into the MAC PDU is located. The receiving terminal performs filtering based on a destination identifier of the received transport block. Data corresponding to different destination identifiers is not multiplexed into a same data block. Therefore, communication efficiency can be improved, and communication reliability can be ensured.

A method for determining the destination identifier by the terminal may be as follows: A higher layer (for example, a NAS layer entity) of the terminal configures a plurality of identifiers for the terminal, and each identifier corresponds to a plurality of LCHs. A MAC layer entity selects an LCH with a highest priority from the at least one LCH (for example, the LCH group 1) selected based on mapping restriction, and determines an identifier corresponding to the LCH with the highest priority as the destination identifier.

As described above, in an embodiment of the application, the transmission performance parameter includes at least one of a subcarrier spacing, an uplink grant type, physical uplink shared channel (PUSCH) transmission duration, or a requirement of a serving cell.

Further, in an embodiment, the transmission performance parameter in an embodiment of the application further includes a first communication range. That the first communication range corresponds to transmit power of the terminal may be understood as that: The first communication range is a communication range that can be ensured if the terminal uses the transmit power, or a minimum distance that a transport block sent by the terminal can reach. The first communication range may be sent or indicated by a PHY layer entity of the terminal to the MAC layer entity.

For example, the first communication range corresponds to maximum transmit power of the terminal.

When the transmission performance parameter further includes the first communication range, the transmission performance parameter requirement includes that the communication range is smaller than or equal to the first communication range. In this way, a communication range of each LCH in the at least one SL LCH (for example, the at least one SL LCH 1 or the at least one SL LCH 2) determined by the terminal is smaller than or equal to the first communication range.

S601: The terminal determines a first SL LCH.

The first SL LCH is an SL LCH that meets a first preset condition in the at least one SL LCH. Herein, the first preset condition includes: a communication range of an SL LCH is equal to a preset threshold, or a priority of an SL LCH is a first priority.

For example, if the first priority is the highest priority, the first SL LCH is an SL LCH with the highest priority in the at least one SL LCH.

S602: The terminal allocates a resource to data of the first SL LCH.

In an embodiment, the terminal allocates, to the data of the first SL LCH, a part of transmission resources of a transport block used to transmit the MAC layer entity.

S603: If a remaining resource of the transmission resources is more than zero, the terminal determines, based on a communication range of the first SL LCH, a second SL LCH that meets a second preset condition in the at least one SL LCH.

The transmission resources herein are resources used to send a transport block, and may be transport blocks, or may be sidelink resources.

A communication range parameter is configured for each SL LCH. After determining the first SL LCH, the terminal may obtain the communication range of the first SL LCH.

With reference to the foregoing descriptions, it can be learned that a value of the communication range corresponds to the transmit power of the terminal, and the communication range is used to identify a minimum communication range. If the terminal sends the data of the first SL LCH, a communication range that can be ensured if the terminal uses the transmit power is the communication range of the first SL LCH. In other words, during actual sending, a communication distance that the data of the first SL LCH can reach should be equal to or greater than a value of the communication range of the first SL LCH. In this way, for an SL LCH (for example, the second SL LCH) whose communication range is smaller than or equal to the communication range of the first SL LCH, at same transmit power, the terminal may also successfully send data of the SL LCH. Based on this, the terminal determines, based on the communication range of the first SL LCH, the second SL LCH that meets the second preset condition in the at least one SL LCH. In an embodiment of the application, the first SL LCH and the second SL LCH are different.

The second preset condition may include: a communication range of an SL LCH is smaller than or equal to the communication range of the first SL LCH. For example, the terminal may determine, in an embodiment A, the second SL LCH that meets the second preset condition.

An embodiment A: The terminal determines, as the second SL LCH, an SL LCH other than the first SL LCH in the at least one SL LCH, and whose priority is higher than that of another SL LCH in SL LCHs whose communication ranges are smaller than and/or equal to the communication range of the first SL LCH.

For example, if the at least one SL LCH includes an SL LCH 1, an SL LCH 2, an SL LCH 3, and an SL LCH 4, the four SL LCHs are sequentially arranged in descending order of priorities as: the SL LCH 3, the SL LCH 1, the SL LCH 4, and the SL LCH 2. A communication range of the SL LCH 1 is 900 meters, a communication range of the SL LCH 2 is 500 meters, a communication range of the SL LCH 3 is 700 meters, and a communication range of the SL LCH 4 is 600 meters. If the terminal determines that the SL LCH 3 is the first SL LCH, the terminal determines whether the communication range of the SL LCH 1 is smaller than or equal to the communication range of the SL LCH 3. Because the communication range of the SL LCH 1 is larger than the communication range of the SL LCH 3, the terminal determines that the SL LCH 1 is not the second SL LCH. In this case, the terminal continues to determine whether the communication range of the SL LCH 4 is smaller than or equal to the communication range of the SL LCH 3. Because the communication range of the SL LCH 4 is smaller than the communication range of the SL LCH 3, the terminal determines the SL LCH 4 as the second SL LCH.

In an embodiment, considering impact of various factors (such as buildings, weather, and tunnels) in actual application, the communication range of the SL LCH may not meet a configuration requirement. A deviation value of the communication range may be further configured for each SL LCH in an embodiment of the application. For example, the deviation value of the communication range is configured by a network device (for example, a base station) or a higher layer (for example, an RRC layer entity, or a NAS layer entity) of the terminal.

In this way, the terminal can determine, based on the communication range and the deviation value of each of the at least one SL LCH, the second SL LCH that meets the second preset condition.

The second preset condition includes: a communication range of an SL LCH is located in a multiplexing interval, a communication interval of an SL LCH includes the communication range of the first SL LCH, or a communication interval of an SL LCH has an intersection with the multiplexing interval.

The multiplexing interval is [the communication range of the first SL LCH−a first deviation value, the communication range of the first SL LCH], or [the communication range of the first SL LCH−the first deviation value, the communication range of the first SL LCH+the first deviation value], or [the communication range of the first SL LCH, the communication range of the first SL LCH+the first deviation value]. The first deviation value is a deviation value of the communication range of the first SL LCH.

The communication interval of the SL LCH is [the communication range of the SL LCH, the communication range of the SL LCH+a deviation value of the communication range of the SL LCH], or [the communication range of the SL LCH−the deviation value of the communication range of the SL LCH, the communication range of the SL LCH+the deviation value of the communication range of the SL LCH], or [the communication range of the SL LCH, the communication range of the SL LCH+the deviation value of the communication range of the SL LCH]

For example, the terminal may determine, in an embodiment I to an embodiment III, the second SL LCH that meets the second preset condition.

An embodiment I: The terminal obtains the deviation value (referred to as the first deviation value for short) of the communication range of the first SL LCH, and determines the multiplexing interval based on the communication range of the first SL LCH and the first deviation value. Subsequently, the terminal determines, as the second SL LCH, an SL LCH other than the first SL LCH in the at least one SL LCH, and whose priority is higher than that of another SL LCH in SL LCHs whose communication ranges are within the multiplexing interval.

For example, if the at least one SL LCH includes an SL LCH 1, an SL LCH 2, and an SL LCH 3, the three SL LCHs are sequentially arranged in descending order of priorities as: the SL LCH 3, the SL LCH 1, and the SL LCH 2. A communication range of the SL LCH 1 is 200 meters, a communication range of the SL LCH 2 is 500 meters, a communication range of the SL LCH 3 is 600 meters, and a deviation value of the communication range of the SL LCH 3 is 100 meters. The terminal determines the SL LCH 3 as the first SL LCH. It is assumed that the multiplexing interval is [600−100, 600]. Because the 200-meter communication range of the SL LCH 1 is not within the multiplexing interval, the terminal determines that the SL LCH 1 is not the second SL LCH. Subsequently, the terminal determines that the 500-meter communication range of the SL LCH 2 is within the multiplexing interval, and therefore determines the SL LCH 2 as the second SL LCH.

An embodiment II: The terminal determines, as the second SL LCH, an SL LCH other than the first SL LCH in the at least one SL LCH, and whose priority is higher than that of another SL LCH in SL LCHs whose communication intervals include the communication range of the first SL LCH.

For example, if the at least one SL LCH includes an SL LCH 1, an SL LCH 2, and an SL LCH 3, the three SL LCHs are sequentially arranged in descending order of priorities as: the SL LCH 1, the SL LCH 2, and the SL LCH 3. The terminal determines the SL LCH 1 as the first SL LCH, and a communication range of the SL LCH 1 is 500 meters. If a communication range of the SL LCH 2 is 300 meters, and a deviation value of the communication range is 200 meters, a communication interval of the SL LCH 2 is [300, 300+200]. Because the communication range of the SL LCH 1 is within the communication interval [300, 300+200], the SL LCH 2 is the second SL LCH.

An embodiment III: The terminal obtains the first deviation value, and determines the multiplexing interval based on the communication range of the first SL LCH and the first deviation value. The terminal determines, as the second SL LCH, an SL LCH other than the first SL LCH in the at least one SL LCH, and whose priority is higher than that of another SL LCH in SL LCHs whose communication ranges have intersections with the multiplexing interval.

For example, if the at least one SL LCH includes an SL LCH 1, an SL LCH 2, and an SL LCH 3, the three SL LCHs are sequentially arranged in descending order of priorities as: the SL LCH 1, the SL LCH 3, and the SL LCH 2. The terminal determines the SL LCH 1 as the first SL LCH, a communication range of the SL LCH 1 is 500 meters, the first deviation value is 100 meters, and the multiplexing interval is [500−100, 500]. If a communication range of the SL LCH 3 is 200 meters, and a deviation value of the communication range is 50 meters, a communication interval of the SL LCH 3 is [200, 200+50]. Because the multiplexing interval [500−100, 500] and the communication interval [200, 200+50] do not have an intersection, the terminal determines that the SL LCH 3 is not the second SL LCH. If a communication range of the SL LCH 2 is 300 meters, and a deviation value of the communication range is 200 meters, a communication interval of the SL LCH 2 is [300, 300+200]. Because the multiplexing interval [500−100, 500] and the communication interval [300, 300+200] have an intersection, the terminal determines the SL LCH 2 as the second SL LCH.

Certainly, in a scenario in which data of SL LCHs with different communication ranges is not allowed to be multiplexed into a same transport block, after determining the first SL LCH, the terminal determines, as the second SL LCH, an SL LCH with the highest priority other than the first SL LCH in the at least one SL LCH, and whose communication range is the same as the communication range of the first SL LCH.

That the priority of the second SL LCH is higher than a priority of an LCH other than the first SL LCH in the at least one SL LCH may be understood as that: The terminal sequentially determines, in descending order of priorities of the SL LCHs, whether the SL LCH meets the second preset condition.

In an embodiment of the application, the network device or the higher layer of the terminal may configure one deviation value of a communication range for the terminal, that is, all SL LCHs of the terminal share one deviation value of communication range. In this case, each SL LCH may further be configured with a dedicated bit, and the dedicated bit is used to indicate whether the SL LCH uses (or is associated with) the deviation value of the communication range.

For example, if a value of a dedicated bit of an SL LCH 1 is "1", it indicates that the SL LCH 1 is to use the shared deviation value of communication range; if the value of the dedicated bit is "0", it indicates that the SL LCH 1 does not use the shared deviation value of communication range.

If an SL LCH does not use the shared deviation value of communication range, and the SL LCH is the first SL LCH, the communication range of the second SL LCH needs to be equal to the communication range of the first SL LCH. Alternatively, when the communication interval of the second SL LCH includes the communication range of the first SL LCH (that is, an embodiment II is used), the terminal may multiplex the first SL LCH and the second SL LCH into a same transmission resource, that is, may pack the first SL LCH and the second SL LCH into a same transport block for sending.

If an SL LCH does not use the shared deviation value of communication range, and the SL LCH is not the first SL LCH, when the communication range of the SL LCH is equal to the communication range of the first SL LCH, the terminal multiplexes the SL LCH and the first SL LCH into a same transport block. Alternatively, when the multiplexing interval includes the communication range of the SL LCH (that is, an embodiment I is used), the terminal multiplexes the SL LCH and the first SL LCH into a same transport block.

S604: The terminal allocates a resource to data of the second SL LCH.

In an embodiment, the terminal allocates, to the data of the second SL LCH, a part of transmission resources of a transport block used to transmit the MAC layer entity.

If there are a plurality of second SL LCHs, the terminal allocates resources to the data of the second SL LCHs in descending order of priorities of the SL LCHs.

In an embodiment, with reference to FIG. 4, S600 to S604 are all performed by the MAC layer entity of the terminal.

It should be noted that, if there is one second SL LCH, and a remaining resource of the transmission resources is more than zero, the terminal may continue to determine a next second SL LCH (referring to S603), and allocate a resource to data of the determined SL LCH, until the terminal has allocated resources to data of all SL LCHs that meet the second preset condition (a communication range of an SL LCH is smaller than and/or equal to the communication range of the first SL LCH, a communication range of an SL LCH is located in the multiplexing interval, or a communication interval of an SL LCH includes the communication range of the first SL LCH, or a communication interval of an SL LCH has an intersection with the multiplexing interval) in the at least one SL LCH, or until the remaining resource of the transmission resources is equal to zero.

In an embodiment of the application, the terminal may further obtain the communication range from allocation information of a sidelink resource, or obtain both the communication range and the deviation value of the communication range, and determine the multiplexing interval based on the obtained communication range and the deviation value. That is, the obtained communication range may be considered as the communication range of the first SL LCH, and the obtained deviation value of the communication range may be considered as the first deviation value. Subsequently, a communication interval of an SL LCH and the multiplexing interval have an intersection, or the multiplexing interval includes a communication range of the SL LCH, it is determined to allocate a resource to data of the SL LCH.

Alternatively, the network device or a higher layer of the terminal may configure a dedicated bit and a deviation value for each SL LCH (where offset values of all SL LCHs of the terminal may be the same or different), to indicate whether the SL LCH uses (or is associated with) the deviation value. For example, if a value of a dedicated bit of an SL LCH is "1", it is used to indicate that the multiplexing interval includes a communication range of the SL LCH, or a communication interval of the SL LCH includes the obtained communication range, or when the communication interval of the SL LCH has an intersection with the multiplexing interval, the terminal may allocate a resource to data of the SL LCH. If a value of a dedicated bit of an SL LCH is "0", it is used to indicate that only data of an SL LCH whose communication range is equal to the obtained communication range is multiplexed into the transport block, or when the multiplexing interval includes the communication range of the SL LCH, the terminal may allocate a resource to data of the SL LCH.

In conclusion, the terminal may multiplex data of SL LCHs with similar or same communication ranges into a same transport block. The terminal multiplexes data of SL LCHs with similar communication ranges into a same transport block. This helps maximize utilization of transmission resources, ensures data reliability, and avoids or minimizes a waste of the transmission resources. The terminal multiplexes data of SL LCHs with a same communication range into a same transport block, so that unnecessary power consumption can be avoided or minimized.

Further, in a scenario in which a remaining resource of the transmission resources is more than zero, and a third SL LCH is configured for the terminal, the terminal may further allocate a resource to data of the third SL LCH. Herein, the third SL LCH does not meet the second preset condition, and a priority of the third SL LCH is higher than a priority of at least one of the first SL LCH and/or all SL LCHs that meet the second preset condition in the at least one SL LCH.

It should be noted that the terminal may allocate the resource to the data of the third SL LCH after allocating the resources to the data of all the SL LCHs that meet the second preset condition in the at least one SL LCH. Alternatively, the terminal may allocate the resource to the data of the third SL LCH before allocating resources to data of one or more SL LCHs that meet the second preset condition in the at least one SL LCH (which is not described in detail in an embodiment of the application). This is not limited in an embodiment of the application.

Figure 7:
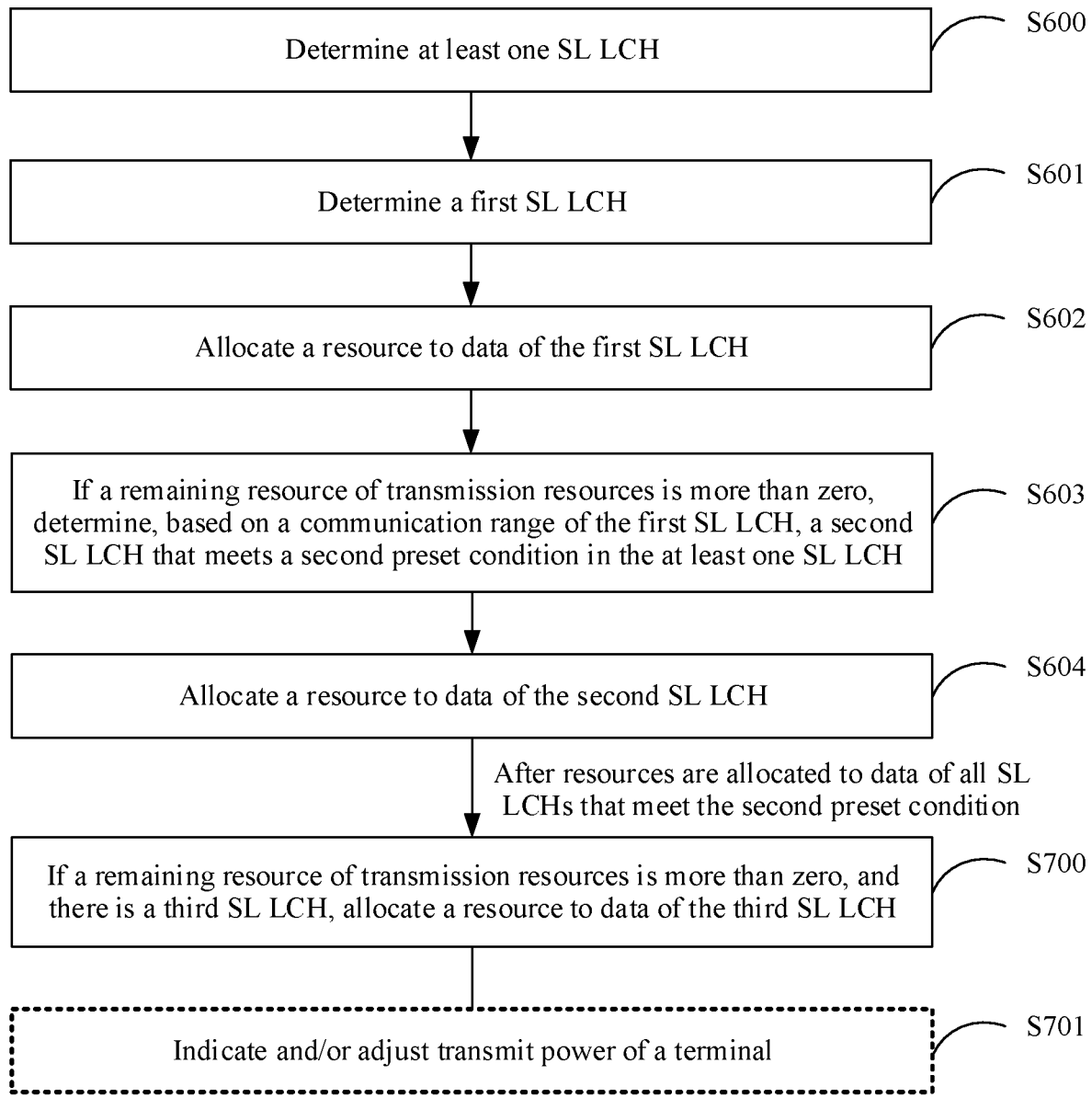
FIG. 7 is another flowchart of an SL LCH multiplexing method according to an embodiment of the application.

A process in which the terminal allocates the resource to the data of the third SL LCH is described below with reference to FIG. 6. In an embodiment, with reference to FIG. 6, as shown in FIG. 7, after that the terminal allocates resources to data of all SL LCHs that meet the second preset condition in the at least one SL LCH, the SL LCH multiplexing method provided in an embodiment of the application further includes the following operations.

S700: If a remaining resource of the transmission resources is more than zero, and a third SL LCH is configured for the terminal, the terminal allocates a resource to data of the third SL LCH.

The third SL LCH does not meet the second preset condition, and a priority of the third SL LCH is higher than a priority of at least one of the first SL LCH and all SL LCHs that meet the second preset condition in the at least one SL LCH.

When there is a remaining transmission resource, the terminal multiplexes the data of the third SL LCH into a transport block, so that transmission of data of a high-priority SL LCH is ensured, a waste of transmission resources is reduced, and effective utilization of the transmission resources is improved.

In an embodiment, S700 is performed by a MAC layer entity of the terminal.

In an embodiment, if there is a remaining transmission resource, the terminal may also directly allocate, in descending order of priorities of SL LCHs, a resource to an SL LCH that does not meet the second preset condition in the at least one SL LCH. In this way, the terminal does not need to compare a priority of the SL LCH that does not meet the second preset condition with a priority of at least one LCH in the at least one SL LCH.

Because the third SL LCH does not meet the second preset condition, a communication range of the third SL LCH may be larger than the first communication range. The first communication range corresponds to transmit power of the terminal. In this way, when the terminal sends a transport block including the data of the third SL LCH, reliability of the data of the third SL LCH is not ensured. To improve data reliability, and to enable each piece of data in the transport block to meet a requirement of a communication range, the terminal may further adjust the transmit power.

As shown in FIG. 7, the SL LCH multiplexing method provided in an embodiment of the application may further include S701.

S701: The terminal indicates and/or adjusts the transmit power of the terminal.

In an embodiment, the MAC layer entity of the terminal sends an adjustment indication to the PHY layer entity, to indicate the PHY layer entity to adjust the transmit power of the terminal, or the MAC layer entity carries the power adjustment indication in other information. Correspondingly, after receiving the adjustment indication, the PHY layer entity adjusts the transmit power of the terminal.

In another embodiment, the MAC layer entity of the terminal sends adjustment information to the PHY layer entity. The adjustment information is used to indicate the PHY layer entity to adjust the transmit power to first transmit power, and the first transmit power corresponds to the communication range of the third SL LCH. That is, the transmit power is adjusted to meet the communication range of the third SL LCH. Correspondingly, after receiving the adjustment information, the PHY layer entity adjusts the transmit power to meet the communication range of the third SL LCH.

In an embodiment, in a process of adjusting the transmit power, the PHY layer entity further needs to communicate with a base station, to obtain approval of the base station. For a communication process between the PHY layer entity and the base station, refer to a method in a current technology in which a terminal communicates with a base station to adjust transmit power. Details are not described herein again.

The terminal may first perform S701 and then perform S700, or may first perform S700 and then perform S701, or may simultaneously perform S701 and S700. This is not limited in an embodiment of the application.

It can be learned that the terminal in an embodiment of the application performs adjustment of the transmit power through inter-layer interaction, so that reliability of data multiplexed into a same transport block is ensured.

In an embodiment, in a scenario in which the at least one SL LCH includes an SL LCH that meets a transmission performance parameter requirement, and the transmission performance parameter includes the first communication range, the terminal may also determine whether a fourth SL LCH (whose communication range is larger than the first communication range and whose priority is higher than a priority of at least one of the at least one SL LCH) exists. If the fourth SL LCH exists, the terminal determines that the at least one SL LCH further includes the fourth SL LCH. In other words, S600 in FIG. 6 may be replaced with S800 to S802 (referring to FIG. 8).

S800: The terminal selects, from all LCHs, an SL LCH whose communication range is smaller than or equal to the first communication range.

S801: The terminal determines a fourth SL LCH.

S802: The terminal determines that the at least one SL LCH includes the selected SL LCH and the fourth SL LCH.

A communication range of the fourth SL LCH is larger than the first communication range, and the first communication range corresponds to the transmit power of terminal. Therefore, when the terminal determines that the at least one SL LCH further includes the fourth SL LCH, to improve data reliability, and to enable each piece of data in the transport block to meet a requirement of a communication range, the terminal may further indicate and/or adjust the transmit power.

Figure 8:
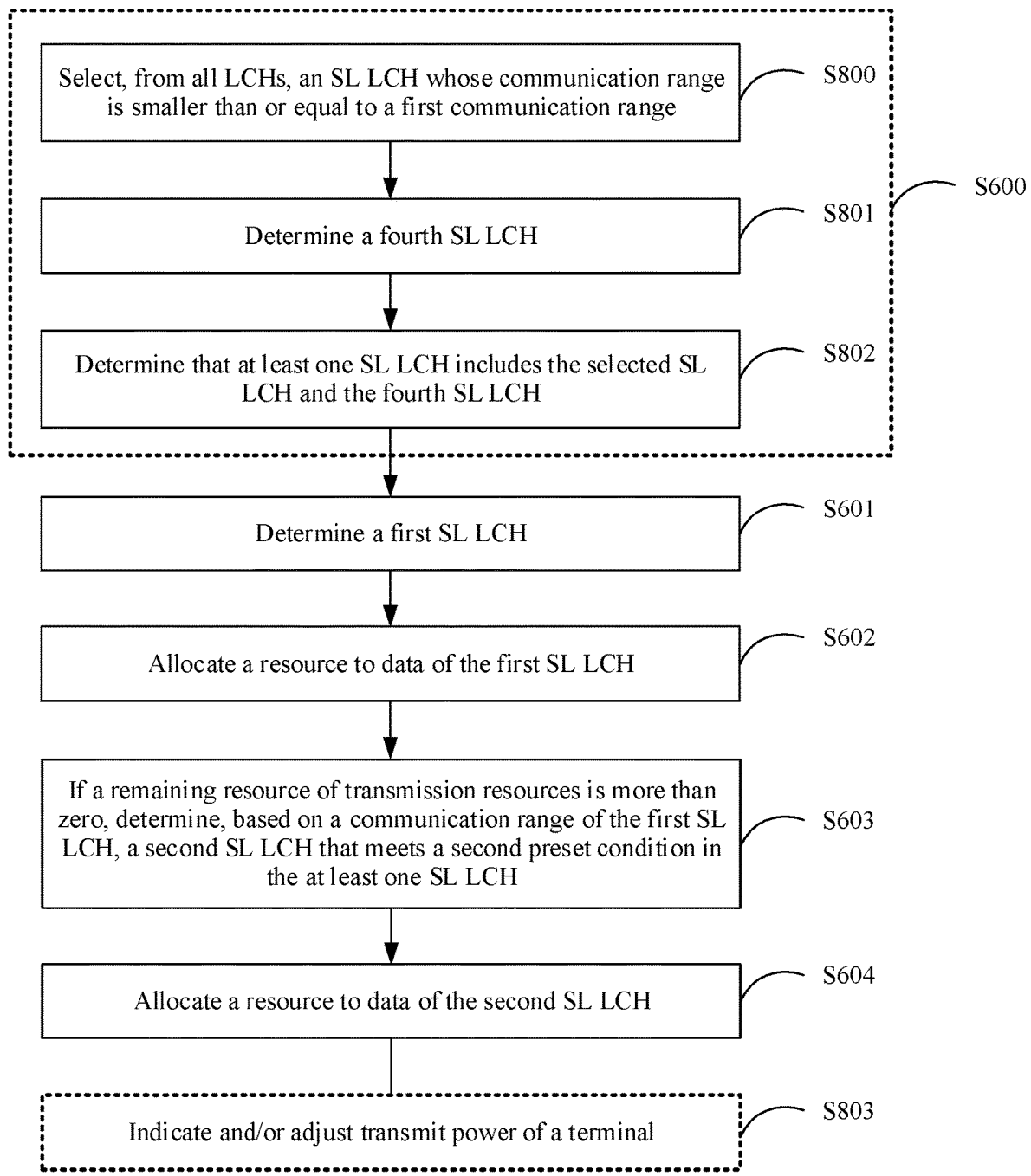
FIG. 8 is another flowchart of an SL LCH multiplexing method according to an embodiment of the application.

As shown in FIG. 8, the SL LCH multiplexing method provided in an embodiment of the application may further include S803.

S803: The terminal indicates and/or adjusts transmit power of the terminal.

For S803, refer to the foregoing descriptions of S701. Details are not described herein again.

The current technology proposes a communication range parameter, but does not provide a solution to applying the communication range parameter to an SL LCH multiplexing process. Therefore, in the SL LCH multiplexing method provided in an embodiment of the application, such a parameter as a communication range may further be considered in a process in which the terminal determines the at least one SL LCH, and then the terminal allocates a resource to data of an LCH in the at least one SL LCH.

Figure 9:
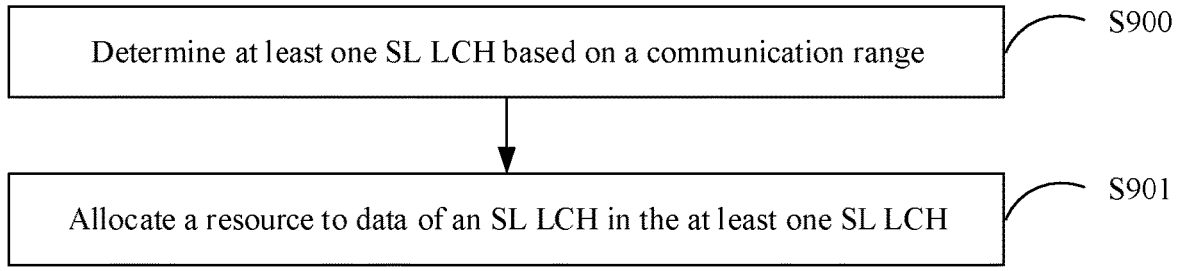
FIG. 9 is another flowchart of an SL LCH multiplexing method according to an embodiment of the application.

In an embodiment, as shown in FIG. 9, the SL LCH multiplexing method provided in an embodiment of the application includes the following operations.

S900: A terminal determines at least one SL LCH based on a communication range.

Herein, each of the at least one SL LCH meets a third preset condition.

For each of the at least one SL LCH, the third preset condition includes: a communication range of an SL LCH is smaller than and/or equal to a first communication range, and the first communication range corresponds to transmit power of the terminal; or includes: transmit power allowed by an SL LCH is less than and/or equal to transmit power of the terminal; or includes: a second communication range is smaller than and/or equal to a first communication range, the first communication range corresponds to transmit power of the terminal, and the second communication range corresponds to transmit power allowed by an SL LCH.

In an embodiment of the application, one or more communication ranges are configured for each SL LCH, each communication range corresponds to one piece of transmit power, and a mapping relationship between the transmit power and the communication range is stored in the terminal. The mapping relationship may be configured by a network device or a higher layer of the terminal. In this way, for each SL LCH, the terminal may determine transmit power that is of the SL LCH and that corresponds to a communication range of.

In an embodiment, a method for determining the at least one SL LCH by the terminal is as follows: After obtaining a sidelink resource, a PHY layer entity of the terminal may determine the transmit power of the terminal based on the sidelink resource. The PHY layer entity indicates the transmit power of the terminal to a MAC layer entity. Subsequently, the MAC layer entity may determine a first communication range corresponding to the transmit power of the terminal. Then, the MAC layer entity selects an SL LCH whose communication range is smaller than and/or equal to the first communication range. In this case, the third preset condition is that a communication range of an SL LCH is smaller than and/or equal to the first communication range.

In an embodiment, a method for determining the at least one SL LCH by the terminal is as follows: After obtaining a sidelink resource, a PHY layer entity of the terminal may determine the transmit power of the terminal based on the sidelink resource, determine, based on a mapping relationship, a first communication range corresponding to the transmit power of the terminal, and indicate the first communication range to a MAC layer entity. Then, the MAC layer entity selects an SL LCH whose communication range is smaller than and/or equal to the first communication range. In this case, the third preset condition is that a communication range of an SL LCH is smaller than and/or equal to the first communication range.

In an embodiment, a method for determining the at least one SL LCH by the terminal is as follows: After obtaining a sidelink resource, a PHY layer entity of the terminal may determine the transmit power of the terminal based on the sidelink resource. The PHY layer entity sends the transmit power of the terminal to a MAC layer entity. Subsequently, the MAC layer entity determines, based on a mapping relationship, transmit power allowed by each SL LCH, and selects an SL LCH whose allowed transmit power is less than and/or equal to the transmit power of the terminal. In this case, the third preset condition is that transmit power allowed by an SL LCH is less than and/or equal to the transmit power of the terminal.

In an embodiment, a PHY layer entity obtains a communication range from sidelink allocation information, where the communication range is the first communication range, and the PHY layer indicates the first communication range to a MAC layer entity. The MAC layer entity selects an SL LCH whose communication range is smaller than and/or equal to the first communication range.

In an embodiment of the application, one or more pieces of allowed transmit power are configured for each SL LCH, each piece of transmit power corresponds to one or more communication ranges, and a mapping relationship between the transmit power and the communication range is stored in the terminal. The mapping relationship may be configured by a network device or a higher layer of the terminal. In this way, for each SL LCH, the terminal may determine a communication range corresponding to allowed transmit power of the SL LCH.

In an embodiment, a method for determining the at least one SL LCH by the terminal is as follows: After obtaining a sidelink resource, a PHY layer entity of the terminal may determine the transmit power of the terminal based on the sidelink resource. The PHY layer entity indicates the transmit power of the terminal to a MAC layer entity. Then, the MAC layer entity selects an SL LCH whose allowed transmit power is less than or equal to the transmit power of the terminal. Alternatively, the MAC layer entity selects an SL LCH that has allowed transmit power less than or equal to the transmit power of the terminal.

In an embodiment, a method for determining the at least one SL LCH by the terminal is as follows: After obtaining a sidelink resource, a PHY layer entity of the terminal may determine the transmit power of the terminal based on the sidelink resource. The PHY layer entity indicates the transmit power of the terminal to a MAC layer entity. Subsequently, the MAC layer entity determines, based on a mapping relationship, a communication range corresponding to the transmit power of the terminal. Alternatively, after obtaining a sidelink resource, a PHY layer entity of the terminal may determine the transmit power of the terminal based on the sidelink resource. Subsequently, the PHY layer entity determines, based on a mapping relationship, a first communication range corresponding to the transmit power. Then, the PHY layer entity indicates the first communication range to a MAC layer. The MAC layer entity determines, based on the mapping relationship, a communication range corresponding to transmit power allowed by each SL LCH. The MAC layer entity selects an SL LCH whose communication range is smaller than or equal to the first communication range.

In an embodiment, a PHY layer entity obtains a communication range from sidelink allocation information, where the communication range is the first communication range, and the PHY layer indicates the first communication range to a MAC layer entity. Subsequently, the MAC layer entity determines, based on the mapping relationship, a communication range corresponding to transmit power allowed by each SL LCH. The MAC layer entity selects an SL LCH whose communication range is smaller than or equal to the first communication range.

In an embodiment, the at least one SL LCH herein corresponds to a same destination identifier.

S901: The terminal allocates a resource to data of an SL LCH in the at least one SL LCH.

In an embodiment, the terminal may allocate the resource to the data of the SL LCH in the at least one SL LCH by using an existing method, that is, allocate the resource to the data of the SL LCH in the at least one SL LCH in descending order of priorities of the SL LCHs. Alternatively, the terminal may allocate the resource to the data of the SL LCH in the at least one SL LCH by using the procedure described in S601 to S604. This is not limited in an embodiment of the application.

The terminal determines the at least one SL LCH based on the communication range. Subsequently, data of SL LCHs with same/similar communication ranges may be multiplexed into a same transport block. In this way, an embodiment of SL LCH multiplexing is provided.

After the terminal allocates the resource to the data of the SL LCH in the at least one SL LCH by using the procedure shown in FIG. 6, a remaining resource of the transmission resources may be still more than zero. If the remaining resource of the transmission resources is still more than zero, the terminal may further allocate, in descending order of priorities, resources to data of SL LCHs that are in the at least one SL LCH and that do not meet a second preset condition (this case is not described in detail in an embodiment of the application). Alternatively, the terminal may allocate a resource to data of a fifth SL LCH not included in the at least one SL LCH, where the fifth SL LCH does not meet the third preset condition, and a priority of the fifth SL LCH is higher than a priority of at least one of the at least one SL LCH.

Figure 10:
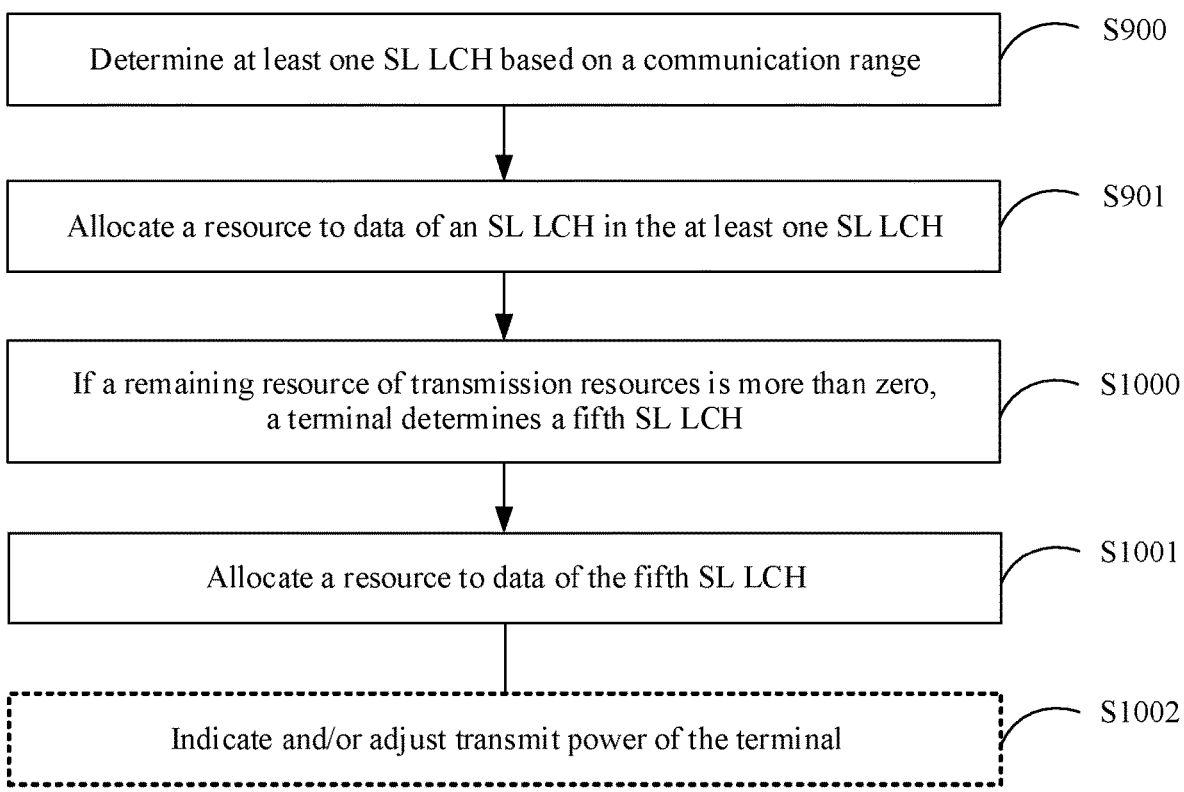
FIG. 10 is another flowchart of an SL LCH multiplexing method according to an embodiment of the application.

With reference to FIG. 9, as shown in FIG. 10, after S901, the SL LCH multiplexing method provided in an embodiment of the application includes the following operations.

S1000: If a remaining resource of the transmission resources is more than zero, the terminal determines a fifth SL LCH.

The fifth SL LCH does not meet the third preset condition, and a priority of the fifth SL LCH is higher than a priority of at least one of the at least one SL LCH.

S1001: The terminal allocates a resource to data of the fifth SL LCH.

Similar to the procedure described in FIG. 7, to improve data reliability, and to enable each piece of data in the transport block to meet a requirement of a communication range, the terminal may further indicate and/or adjust transmit power.

In an embodiment, if there is a remaining transmission resource, the terminal may also directly allocate, in descending order of priorities of SL LCHs, a resource to an SL LCH that does not meet the third preset condition in the at least one SL LCH. In this way, the terminal does not need to compare a priority of the SL LCH that does not meet the third preset condition with a priority of at least one LCH in the at least one SL LCH.

As shown in FIG. 10, the SL LCH multiplexing method provided in an embodiment of the application may further include S1002.

S1002: The terminal indicates and/or adjusts transmit power.

For S1002, refer to the foregoing descriptions of S701. Details are not described herein again.

In an embodiment, in S900, the terminal may also determine whether an SL LCH b (that does not meet the third preset condition and whose priority is higher than a priority of at least one LCH in the at least one SL LCH) exists. If the SL LCH b exists, the terminal determines that the at least one SL LCH further includes the SL LCH b. In other words, S900 in FIG. 9 may be replaced with S1100 to S1102 (referring to FIG. 11).

S1100: The terminal selects, from all LCHs, an SL LCH that meets a third preset condition.

S1101: The terminal determines an SL LCH b.

S1102: The terminal determines that the at least one SL LCH includes the selected SL LCH and the SL LCH b.

Because the SL LCH b does not meet the third preset condition, a communication range of the SL LCH b is larger than the first communication range. The first communication range corresponds to the transmit power of terminal. When the terminal determines that the at least one SL LCH includes the SL LCH b, to improve data reliability, and to enable each piece of data in the transport block to meet a requirement of a communication range, the terminal may further adjust current maximum transmit power. For example, the MAC layer entity indicates the PHY layer entity to adjust power.

Figure 11:
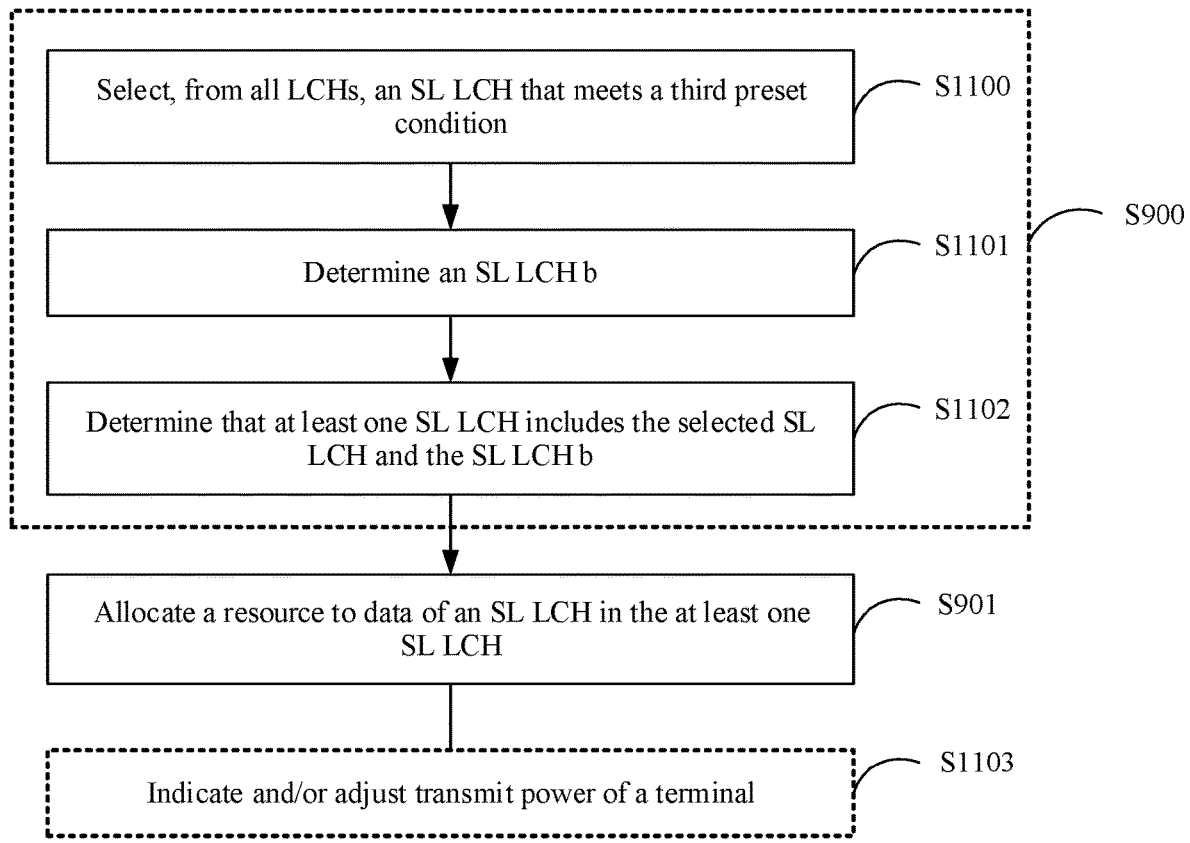
FIG. 11 is another flowchart of an SL LCH multiplexing method according to an embodiment of the application.

As shown in FIG. 11, the SL LCH multiplexing method provided in an embodiment of the application may further include S1103.

S1103: The terminal indicates and/or adjusts transmit power of the terminal.

For S1103, refer to the foregoing descriptions of S701. Details are not described herein again.

In conclusion, in an embodiment of the application, the terminal may multiplex data of SL LCHs with similar or same communication ranges into a same transport block. The terminal multiplexes data of SL LCHs with similar communication ranges into a same transport block. This helps maximize utilization of transmission resources, ensures data reliability, and avoids or minimizes overconsumption of the transmit power and a waste of the transmission resources. The terminal multiplexes data of SL LCHs with a same communication range into a same transport block, so that unnecessary power consumption can be avoided or minimized.

The foregoing mainly describes the solutions provided in embodiments of the application from a perspective of the methods. To perform the foregoing functions, corresponding hardware structures and/or software modules for performing the functions are included. One of ordinary skill in the art should easily be aware that, in combination with units and algorithm operations of the examples described in in the specification, an embodiment of the application may be implemented by hardware or a combination of hardware and computer software. Whether a function is performed by hardware or hardware driven by computer software depends on particular applications and design constraint conditions of the technical solutions. One of ordinary skill in the art may use different methods to perform the described functions for each particular application, but it should not be considered that an embodiment goes beyond the scope of the application.

In embodiments of the application, the terminal may be divided into function modules based on the foregoing method examples. For example, function modules corresponding to the functions may be obtained through division, or two or more functions may be integrated into one processing module. The integrated module may be implemented in a form of hardware, or may be implemented in a form of a software function module. In embodiments of the application, division into modules is used as an example, and is merely logical function division. In an embodiment, another division manner may be used.

Figure 12:
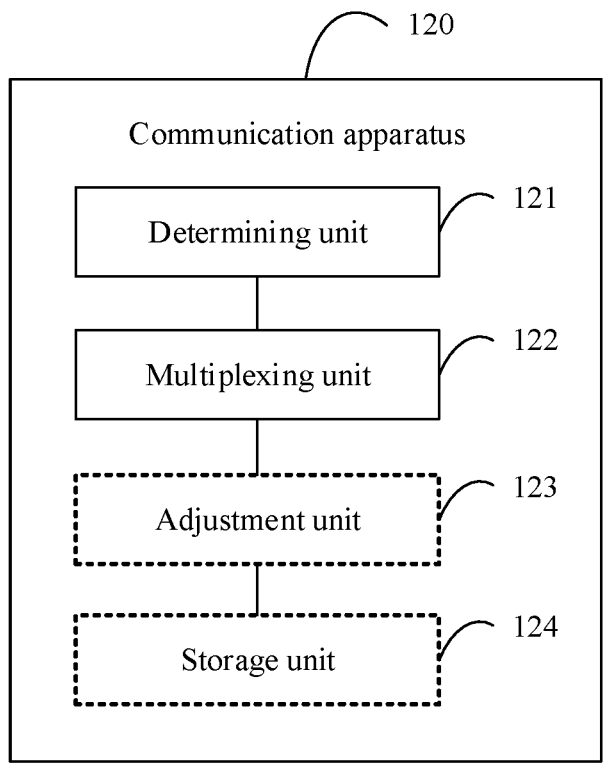
FIG. 12 is a schematic diagram of a structure of a communication apparatus according to an embodiment of the application.

FIG. 12 shows a schematic composition diagram of a communication apparatus (denoted as a communication apparatus 120). The communication apparatus 120 may be a terminal, or may be a chip or a system on chip in the terminal. The communication apparatus 120 may be configured to perform functions of the terminal in the foregoing embodiments. In an embodiment, the communication apparatus 120 shown in FIG. 12 includes a determining unit 121 and a multiplexing unit 122.

The determining unit 121 is configured to determine a first SL LCH, where the first SL LCH is an SL LCH that meets a first preset condition in at least one SL LCH.

The multiplexing unit 122 is configured to allocate a resource to data of the first SL LCH determined by the determining unit 121.

The determining unit 121 is further configured to: when a remaining resource of transmission resources is more than zero, determine, based on a communication range of the first SL LCH, a second SL LCH in the at least one SL LCH, where the first SL LCH and the second SL LCH are different.

The multiplexing unit 122 is further configured to allocate a resource to data of the second SL LCH determined by the determining unit 121.

In an embodiment, the first preset condition includes: a communication range of an SL LCH is equal to a preset threshold; or the first preset condition includes: a priority of an SL LCH is a first priority.

In an embodiment, the second preset condition includes: a communication range of an SL LCH is smaller than or equal to the communication range of the first SL LCH; or includes: a communication range of an SL LCH is located in a multiplexing interval; or includes: a communication interval of an SL LCH includes the communication range of the first SL LCH; or includes: a communication interval of an SL LCH has an intersection with a multiplexing interval, where the multiplexing interval is [the communication range of the first SL LCH−a first deviation value, the communication range of the first SL LCH], and the first deviation value is a deviation value of the communication range of the first SL LCH; and the communication interval of the SL LCH is [the communication range of the SL LCH, the communication range of the SL LCH+a deviation value of the communication range of the SL LCH].

In an embodiment, the second preset condition includes: a communication range of an SL LCH is smaller than or equal to the communication range of the first SL LCH; or includes: a communication range of an SL LCH is located in a multiplexing interval; or includes: a communication interval of an SL LCH includes the communication range of the first SL LCH; or includes: a communication interval of an SL LCH has an intersection with a multiplexing interval, where the multiplexing interval is [the communication range of the first SL LCH−a first deviation value, the communication range of the first SL LCH+the first deviation value] or [the communication range of the first SL LCH, the communication range of the first SL LCH+the first deviation value]; and the communication interval of the SL LCH is [the communication range of the SL LCH−a deviation value of the communication range of the SL LCH, the communication range of the SL LCH+the deviation value of the communication range of the SL LCH] or [the communication range of the SL LCH, the communication range of the SL LCH+the deviation value of the communication range of the SL LCH].

In an embodiment, the determining unit 121 is configured to determine, as the second SL LCH, an SL LCH other than the first SL LCH in the at least one SL LCH, and whose priority is higher than that of another SL LCH in SL LCHs that meet the second preset condition.

In an embodiment, the multiplexing unit 122 is further configured to: when a remaining resource of the transmission resources is more than zero, and the communication apparatus 120 is configured with a third SL LCH, allocate a resource to data of the third SL LCH, where the third SL LCH does not meet the second preset condition, and a priority of the third SL LCH is higher than a priority of at least one of the first SL LCH and the second SL LCH.

In an embodiment, the multiplexing unit 122 is further configured to: before allocating the resource to the data of the third SL LCH, allocate resources to data of all SL LCHs that meet the second preset condition in the at least one SL LCH.

In an embodiment, the determining unit 121 is further configured to: when the communication apparatus 120 is configured with a fourth SL LCH, determine that the at least one SL LCH further includes the fourth SL LCH, where a communication range of the fourth SL LCH is larger than a first communication range, a priority of the fourth SL LCH is higher than a priority of at least one LCH in the at least one SL LCH, and the first communication range corresponds to transmit power of the communication apparatus.

In an embodiment, the communication apparatus 120 further includes an adjustment unit 123, where the adjustment unit 123 is configured to indicate and/or adjust the transmit power of the communication apparatus.

In an embodiment, each of the at least one SL LCH corresponds to a same destination identifier.

In an embodiment, the communication apparatus 120 further includes a storage unit 124. The storage unit 124 is configured to store program code and the like of the communication apparatus 120.

Figure 13:
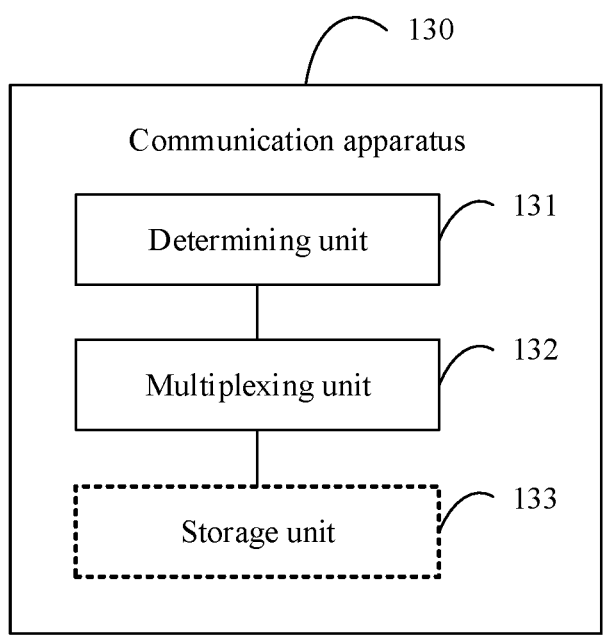
FIG. 13 is a schematic diagram of another structure of a communication apparatus according to an embodiment of the application.

FIG. 13 shows a schematic composition diagram of a communication apparatus (denoted as a communication apparatus 130). The communication apparatus 130 may be a terminal, or may be a chip or a system on chip in the terminal. The communication apparatus 130 may be configured to perform functions of the terminal in the foregoing embodiments. In an embodiment, the communication apparatus 130 shown in FIG. 13 includes a determining unit 131 and a multiplexing unit 132.

The determining unit 131 is configured to determine, based on a communication range, at least one SL LCH, where each of the at least one SL LCH meets a third preset condition.

The multiplexing unit 132 is configured to allocate a resource to an SL LCH in the at least one SL LCH determined by the determining unit 131.

In an embodiment, for each of the at least one SL LCH, the third preset condition includes: a communication range of an SL LCH is smaller than or equal to a first communication range, and the first communication range corresponds to transmit power of the communication apparatus 130; or includes: transmit power allowed by an SL LCH is less than or equal to transmit power of the communication apparatus 130; or includes: a second communication range is smaller than or equal to a first communication range, the first communication range corresponds to transmit power of the communication apparatus 130, and the second communication range corresponds to transmit power allowed by an SL LCH.

In an embodiment, the determining unit 131 is further configured to determine that the at least one SL LCH further includes a fifth SL LCH, where the fifth SL LCH does not meet the third preset condition, and a priority of the fifth SL LCH is higher than a priority of at least one of the at least one SL LCH.

In an embodiment, the multiplexing unit 132 is further configured to: after a resource is allocated to data of an SL LCH in the at least one SL LCH, if a remaining transmission resource of the transmission resources is more than zero, and the communication apparatus 130 is configured with a fifth SL LCH, allocate a resource to data of the fifth SL LCH, where the fifth SL LCH does not meet the third preset condition, and a priority of the fifth SL LCH is higher than a priority of at least one of the at least one SL LCH.

In an embodiment, each of the at least one SL LCH corresponds to a same destination identifier.

In an embodiment, the communication apparatus 130 further includes a storage unit 133. The storage unit 133 is configured to store program code and the like of the communication apparatus 130.

For a block diagram of entities of the communication apparatus 120 and the communication apparatus 130 provided in the application, refer to FIG. 5. The determining unit 121, the multiplexing unit 122, the adjustment unit 123, the determining unit 131, and the multiplexing unit 132 may be the processor 51 in FIG. 5. The storage unit 124 and the storage unit 133 may be the memory 52 in FIG. 5.

The units in FIG. 12 and FIG. 13 may alternatively be referred to as modules. For example, the processing unit may be referred to as a processing module. In addition, in embodiments shown in FIG. 12 and FIG. 13, names of the units may alternatively not be the names shown in the figures. For example, a unit that obtains the first deviation value may also be referred to as a processing unit (for example, the adjustment unit 123 may be referred to as the processing unit), and this depends on a division manner of the modules.

When the units in FIG. 12 and FIG. 13 are implemented in a form of software function modules and sold or used as independent products, the units may be stored in a computer-readable storage medium. Based on such an understanding, the technical solutions in embodiments of the application essentially, the part contributing to the current technology, or all or some of the technical solutions may be implemented in a form of a software product. The computer software product is stored in a storage medium and includes several instructions for instructing a computer device (which may be a personal computer, a server, a network device, or the like) or a processor to perform all or some of the operations of the methods described in embodiments of the application. The storage medium that stores the computer software product includes any medium that can store program code, for example, a USB flash drive, a removable hard disk, a read-only memory (ROM), a random access memory (RAM), a magnetic disk, or an optical disc.

An embodiment of the application further provides a computer-readable storage medium, including instructions. When the instructions are run on a computer, the computer is enabled to perform any one of the foregoing methods.

An embodiment of the application further provides a computer program product including instructions. When the instructions are run on a computer, the computer is enabled to perform any one of the foregoing methods.

All or some of the foregoing embodiments may be implemented by using software, hardware, firmware, or any combination thereof. When a software program is used to implement embodiments, all or some of embodiments may be implemented in a form of a computer program product. The computer program product includes one or more computer instructions. When the computer program instructions are loaded and executed on the computer, the procedure or functions according to embodiments of the application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a web site, computer, server, or data center to another web site, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although the application is described with reference to embodiments, in a process of implementing the application that claims protection, one of ordinary skill in the art may understand and implement another variation of the disclosed embodiments by viewing the accompanying drawings, disclosed content, and the appended claims. In the claims, "comprising" does not exclude another component or another operation, and "a" or "one" does not exclude a meaning of plurality. A single processor or another unit may perform several functions enumerated in the claims. Some measures are recorded in dependent claims that are different from each other, but this does not mean that these measures cannot be combined to produce a great effect.

Although the application is described with reference to features and embodiments thereof, it is clear that various modifications and combinations may be made to them without departing from the spirit and scope of the application. Correspondingly, the specification and accompanying drawings are merely descriptions of examples of the application defined by the appended claims, and are considered as any of or all modifications, variations, combinations, or equivalents that cover the scope of the application. It is clear that, one of ordinary skill in the art can make various modifications and variations to the application without departing from the spirit and scope of the application. The application is intended to cover these modifications and variations of the application provided that they fall within the scope of the claims of the application and their equivalent technologies.

What is claimed is:

1. A sidelink logical channel (SL LCH) multiplexing method, comprising:
   determining, by a terminal, a first SL LCH, wherein the first SL LCH is an SL LCH that meets a first preset condition in at least one SL LCH, and wherein the first preset condition comprises a first priority;
   allocating, by the terminal, a resource to data of the first SL LCH;
   when a remaining resource of transmission resources is more than zero, determining, by the terminal according to a communication range of the first SL LCH, a second SL LCH that meets a second preset condition in the at least one SL LCH, wherein the first SL LCH and the second SL LCH are different; and
   allocating, by the terminal, a resource to data of the second SL LCH.

2. The multiplexing method according to claim 1, wherein the second preset condition comprises a communication range of an SL LCH that is smaller than or equal to the communication range of the first SL LCH,
   a communication range of an SL LCH that is located in a multiplexing interval,
   a communication interval of an SL LCH that comprises the communication range of the first SL LCH,
   or
   a communication interval of an SL LCH that has an intersection with the multiplexing interval, wherein
   the multiplexing interval is [the communication range of the first SL LCH−a first deviation value, the communication range of the first SL LCH], and the first deviation value is a deviation value of the communication range of the first SL LCH; and
   the communication interval of the SL LCH is [the communication range of the SL LCH, the communication range of the SL LCH+a deviation value of the communication range of the SL LCH].

3. The multiplexing method according to claim 1, wherein the second preset condition comprises a communication range of an SL LCH that is smaller than or equal to the communication range of the first SL LCH,
   a communication range of an SL LCH that is located in a multiplexing interval;
   a communication interval of an SL LCH that comprises the communication range of the first SL LCH,
   or
   a communication interval of an SL LCH that has an intersection with a multiplexing interval, wherein
   the multiplexing interval is [the communication range of the first SL LCH−a first deviation value, the communication range of the first SL LCH+the first deviation value] or [the communication range of the first SL LCH, the communication range of the first SL LCH+ the first deviation value]; and
   the communication interval of the SL LCH is [the communication range of the SL LCH−a deviation value of the communication range of the SL LCH, the communication range of the SL LCH+the deviation value of the communication range of the SL LCH] or [the communication range of the SL LCH, the communication range of the SL LCH+the deviation value of the communication range of the SL LCH].

4. The multiplexing method according to claim 1, wherein the determining, by the terminal according to the communication range of the first SL LCH, the second SL LCH that meets the second preset condition in the at least one SL LCH comprises determining, by the terminal as the second SL LCH, an SL LCH other than the first SL LCH in the at least one SL LCH, and whose priority is higher than that of another SL LCH in SL LCHs that meet the second preset condition.

5. The multiplexing method according to claim 1, further comprising:

allocating, by the terminal, a resource to data of the SL LCH that meets the second preset condition in the at least one SL LCH.

6. The multiplexing method according to claim 5, further comprising:

when the remaining resource of the transmission resources is more than zero, and a third SL LCH is configured for the terminal, allocating, by the terminal, a resource to data of the third SL LCH, wherein the third SL LCH does not meet the second preset condition, and a priority of the third SL LCH is higher than a priority of at least one of the first SL LCH and all SL LCHs that meet the second preset condition in the at least one SL LCH.

7. The multiplexing method according to claim 1, further comprising:

determining, by the terminal, that the at least one SL LCH comprises a fourth SL LCH, wherein a communication range of the fourth SL LCH is larger than a first communication range, a priority of the fourth SL LCH is higher than a priority of at least one of the at least one SL LCH, and the first communication range corresponds to a transmit power of the terminal.

8. The multiplexing method according to claim 5, further comprising:

indicating or adjusting, by the terminal, the transmit power of the terminal.

9. The multiplexing method according to claim 1, wherein the at least one SL LCH corresponds to a same destination identifier.

10. A communication apparatus, comprising:
at least one processor, and
one or more memories coupled to the at least one processor, wherein the at least one processor is configured to:

determine a first sidelink logical channel (SL LCH), wherein the first SL LCH is an SL LCH that meets a first preset condition in at least one SL LCH, and wherein the first preset condition comprises a first priority; and allocate a resource to data of the first SL LCH;

when a remaining resource of transmission resources is more than zero, determining, according to a communication range of the first SL LCH, a second SL LCH that meets a second preset condition in the at least one SL LCH, wherein the first SL LCH and the second SL LCH are different; and allocate a resource to data of the second SL LCH determined.

11. The communication apparatus according to claim 10, wherein the second preset condition comprises a communication range of an SL LCH that is smaller than or equal to the communication range of the first SL LCH, a communication range of an SL LCH that is located in a multiplexing interval;

a communication interval of an SL LCH that comprises the communication range of the first SL LCH, or a communication interval of an SL LCH has an intersection with the multiplexing interval, wherein the multiplexing interval is [the communication range of the first SL LCH−a first deviation value, the communication range of the first SL LCH], and the first deviation value is a deviation value of the communication range of the first SL LCH; and the communication interval of the SL LCH is [the communication range of the SL LCH, the communication range of the SL LCH+a deviation value of the communication range of the SL LCH].

12. The communication apparatus according to claim 10, wherein the second preset condition comprises a communication range of an SL LCH that is smaller than or equal to the communication range of the first SL LCH;

a communication range of an SL LCH that is located in a multiplexing interval;

a communication interval of an SL LCH that comprises the communication range of the first SL LCH;

or a communication interval of an SL LCH that has an intersection with the multiplexing interval, wherein the multiplexing interval is [the communication range of the first SL LCH−a first deviation value, the communication range of the first SL LCH+the first deviation value] or [the communication range of the first SL LCH, the communication range of the first SL LCH+the first deviation value]; and the communication interval of the SL LCH is [the communication range of the SL LCH−a deviation value of the communication range of the SL LCH, the communication range of the SL LCH+the deviation value of the communication range of the SL LCH] or [the communication range of the SL LCH, the communication range of the SL LCH+the deviation value of the communication range of the SL LCH].

13. The communication apparatus according to claim 10, wherein the at least one processor is further configured to:

determine, as the second SL LCH, an SL LCH other than the first SL LCH in the at least one SL LCH, and whose priority is higher than that of another SL LCH in SL LCHs that meet the second preset condition.

14. The communication apparatus according to claim 10, wherein the at least one processor is further configured to:

allocate a resource to data of the SL LCH that meets the second preset condition in the at least one SL LCH.

15. The communication apparatus according to claim 14, wherein the at least one processor is further configured to:

when the remaining resource of the transmission resources is more than zero, and a third SL LCH is configured for the communication apparatus, allocating a resource to data of the third SL LCH, wherein the third SL LCH does not meet the second preset condition, and a priority of the third SL LCH is higher than a priority of at least one of the first SL LCH and the second SL LCH.

16. The communication apparatus according to claim 10, wherein the at least one processor is further configured to:

when a fourth SL LCH is configured for the communication apparatus, determine that the at least one SL LCH comprises the fourth SL LCH; and a communication range of the fourth SL LCH is larger than a first communication range, a priority of the fourth SL LCH is higher than a priority of at least one LCH in the at least one SL LCH, and the first communication range corresponds to a transmit power of the communication apparatus.

17. The communication apparatus according to claim 14, wherein the at least one processor is further configured to:
  indicate or adjust the transmit power of the communication apparatus.

18. The communication apparatus according to claim 10, wherein
  the at least one SL LCH corresponds to a same destination identifier.

\* \* \* \* \*